(12) United States Patent
Aga et al.

(10) Patent No.: US 10,175,889 B2
(45) Date of Patent: Jan. 8, 2019

(54) MEMORY SYSTEM CAPABLE OF ACCESSING MEMORY CELL ARRAYS IN PARALLEL

(71) Applicant: Toshiba Memory Corporation, Minato-ku (JP)

(72) Inventors: Sayano Aga, Chigasaki (JP); Toshikatsu Hida, Yokohama (JP); Riki Suzuki, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 15/264,119

(22) Filed: Sep. 13, 2016

(65) Prior Publication Data

US 2017/0262192 A1 Sep. 14, 2017

Related U.S. Application Data

(60) Provisional application No. 62/306,493, filed on Mar. 10, 2016.

(51) Int. Cl.
*G06F 12/00* (2006.01)
*G06F 13/00* (2006.01)
(Continued)

(52) U.S. Cl.
CPC .......... *G06F 3/0611* (2013.01); *G06F 3/0656* (2013.01); *G06F 3/0659* (2013.01);
(Continued)

(58) Field of Classification Search
None
See application file for complete search history.

(56) References Cited

U.S. PATENT DOCUMENTS 6,377,500 B1 * 4/2002 Fujimoto ............ G06F 12/0246
365/230.01
7,450,462 B2 11/2008 Lee
(Continued)

FOREIGN PATENT DOCUMENTS

JP 2011-519095 6/2011
JP 2012-502332 1/2012

*Primary Examiner* — Sean D Rossiter
(74) *Attorney, Agent, or Firm* — Oblon, McClelland, Maier & Neustadt, L.L.P.

(57) ABSTRACT

According to one embodiment, a memory system includes a first memory as a nonvolatile memory storing first data, second data as a translation table for accessing the first data, third data, fourth data as a translation table for accessing the third data, and including two memory cell arrays which are accessible in parallel, a second memory in which the second and fourth data is storable, and which stores a management table for managing information about whether the second and fourth data is stored in the second memory, a controller checking whether the second and fourth data is stored in the second memory based on the management table, a third memory storing an order of executing commands to be issued to the first memory, and a scheduler scheduling the order based on a result of the checking, two of a first command for reading the first data, a second command for reading the second data, a third command for reading the third data and a fourth command for reading the fourth data being executed in parallel in the order.

21 Claims, 35 Drawing Sheets

(51) Int. Cl.
*G06F 3/06* (2006.01)
*G06F 12/02* (2006.01)
*G06F 12/10* (2016.01)

(52) U.S. Cl.
CPC ........ *G06F 3/0679* (2013.01); *G06F 12/0246* (2013.01); *G06F 12/10* (2013.01); *G06F 2212/1024* (2013.01); *G06F 2212/2022* (2013.01)

(56) References Cited

U.S. PATENT DOCUMENTS

| | | | |
|---|---|---|---|
| 2008/0126682 A1* | 5/2008 | Zhao | G06F 3/0613 711/103 |
| 2009/0271562 A1 | 10/2009 | Sinclair | |
| 2010/0058003 A1 | 3/2010 | Goto et al. | |
| 2015/0039808 A1* | 2/2015 | Kaburaki | G06F 12/0246 711/103 |
| 2015/0347292 A1* | 12/2015 | Fujita | G06F 12/0246 711/103 |
| 2016/0124682 A1* | 5/2016 | Koizumi | G06F 3/0679 711/103 |
| 2017/0235681 A1* | 8/2017 | Kaburaki | G06F 12/0292 711/128 |

* cited by examiner

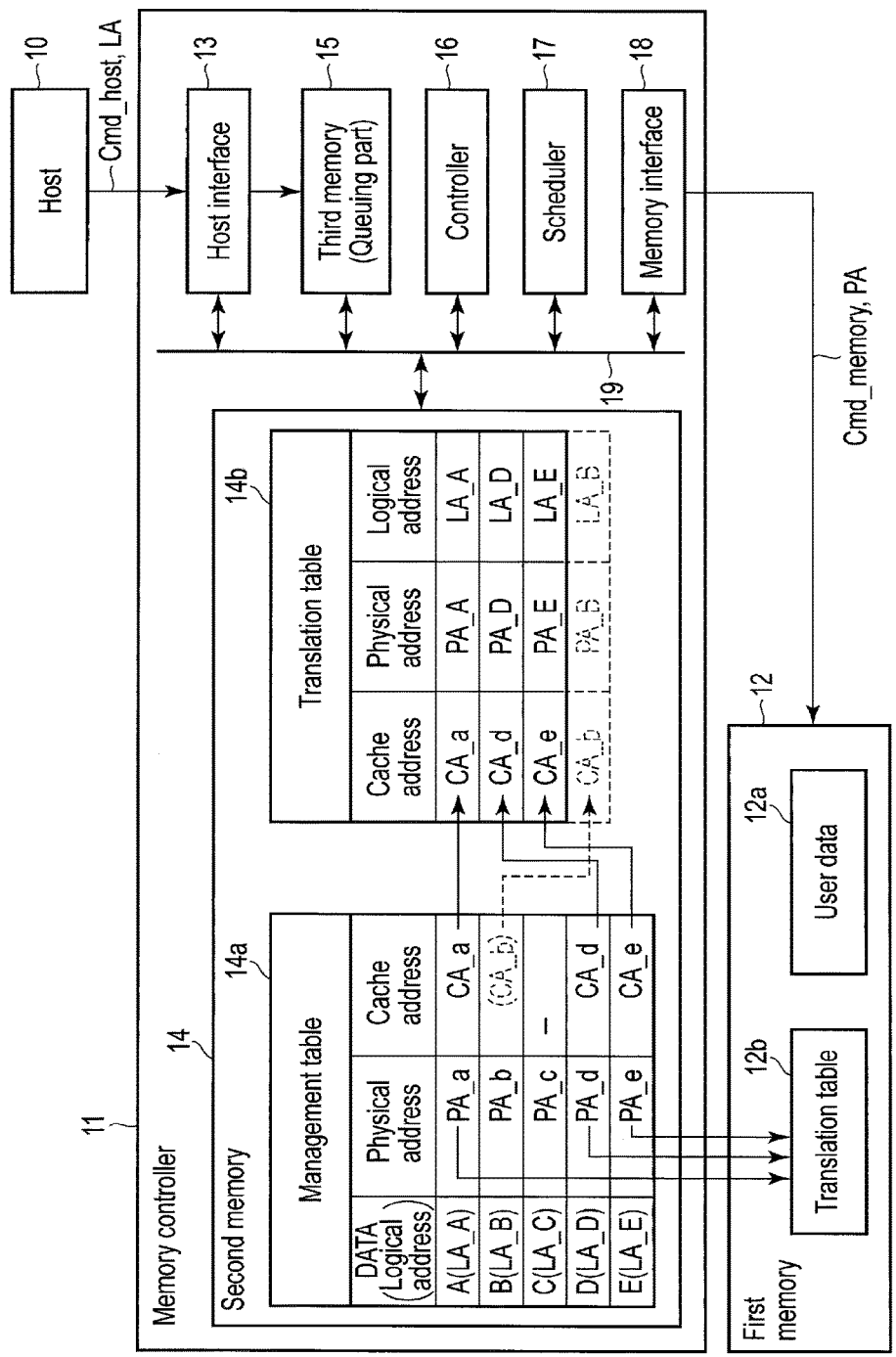
F I G. 1

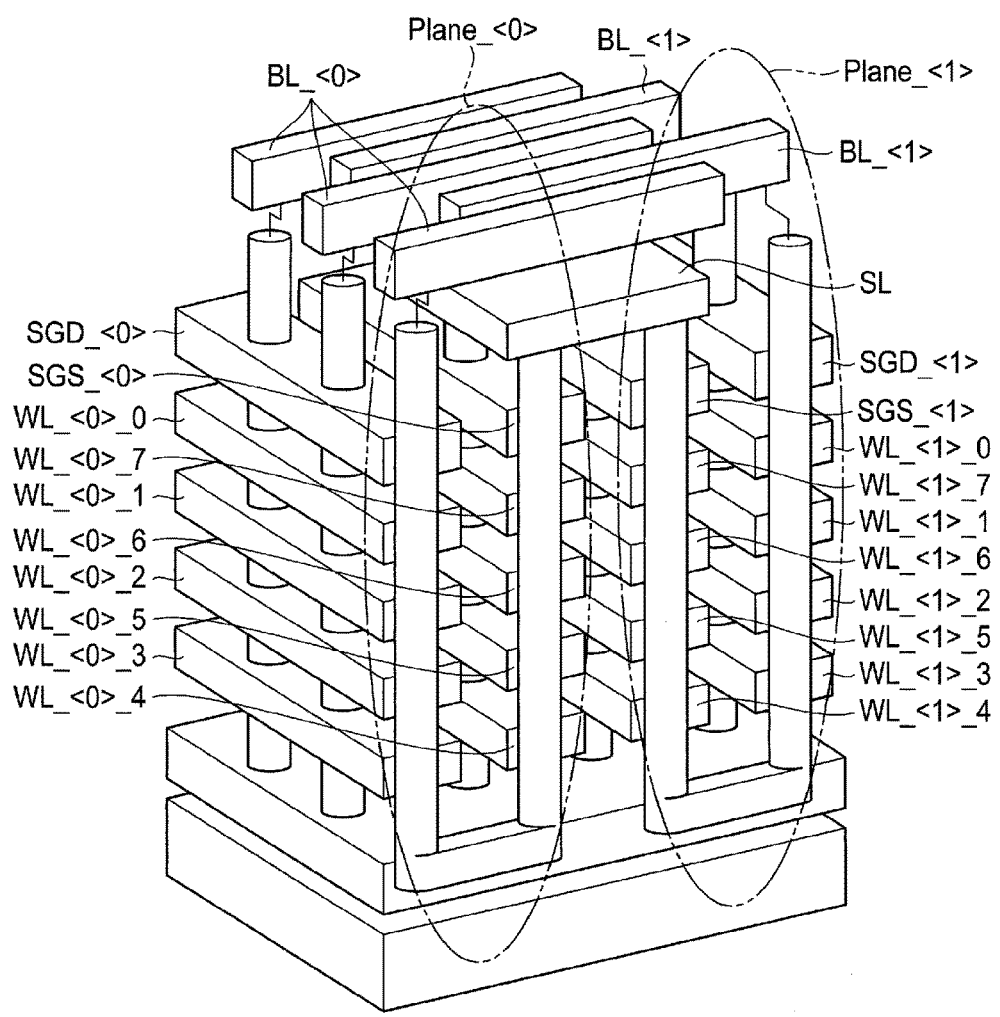
F I G. 3

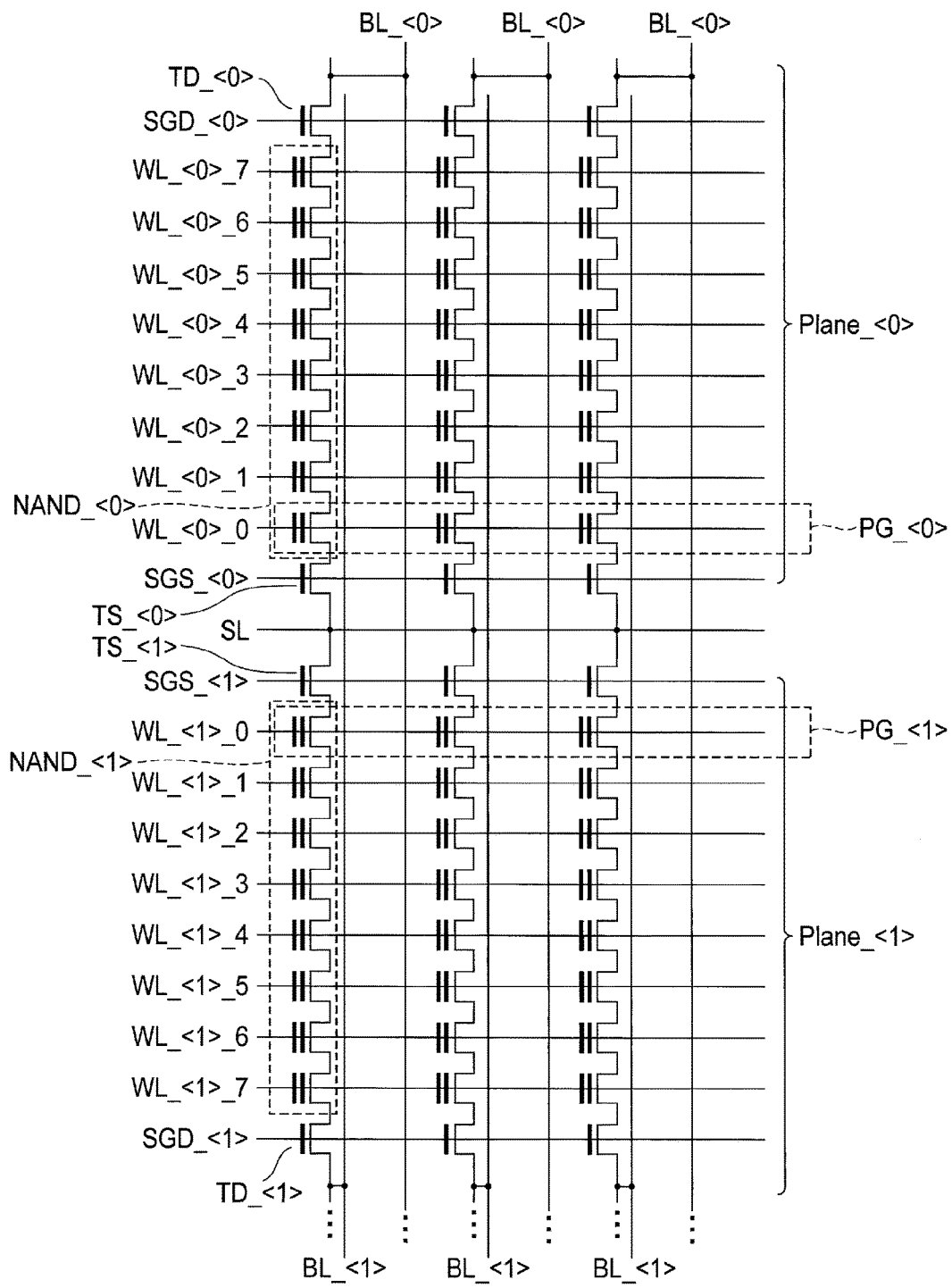
F I G. 4

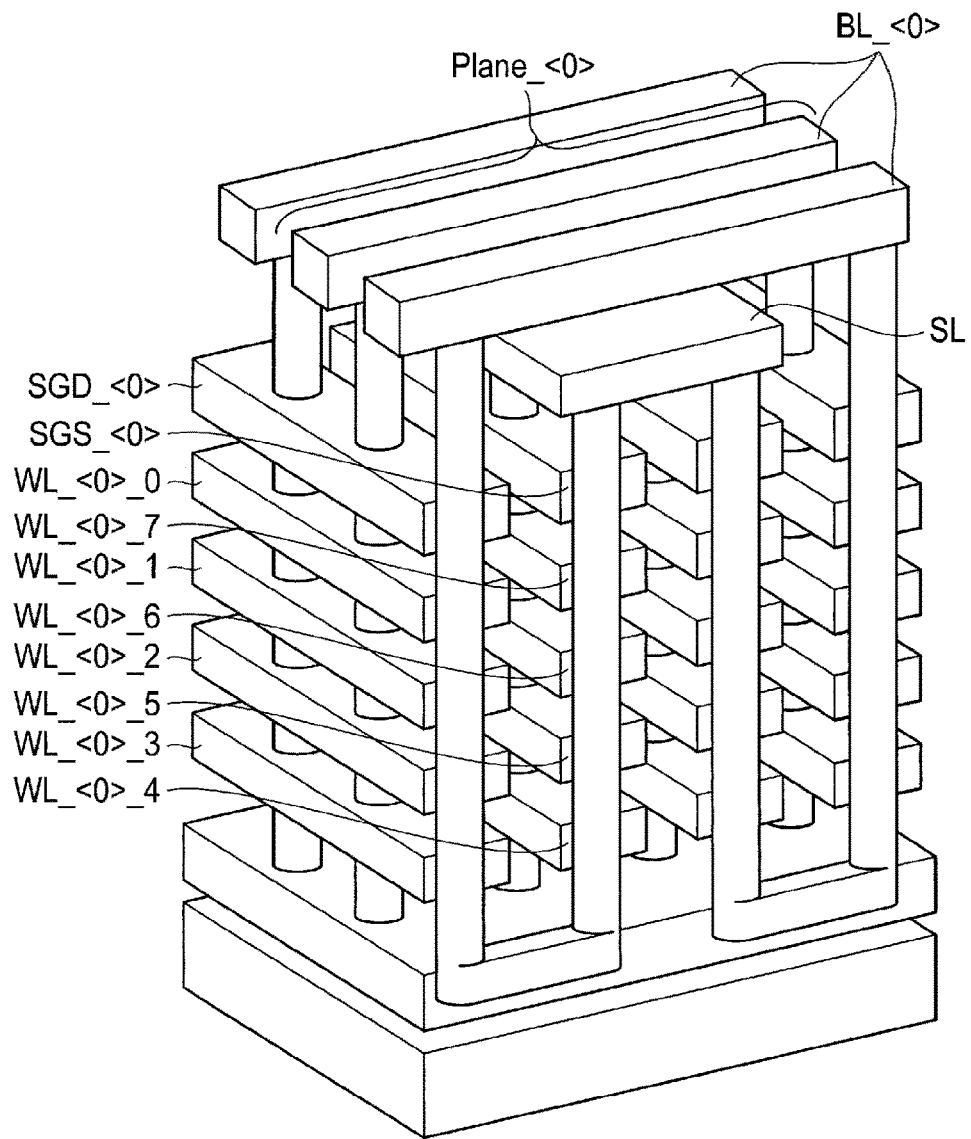
F I G. 5A

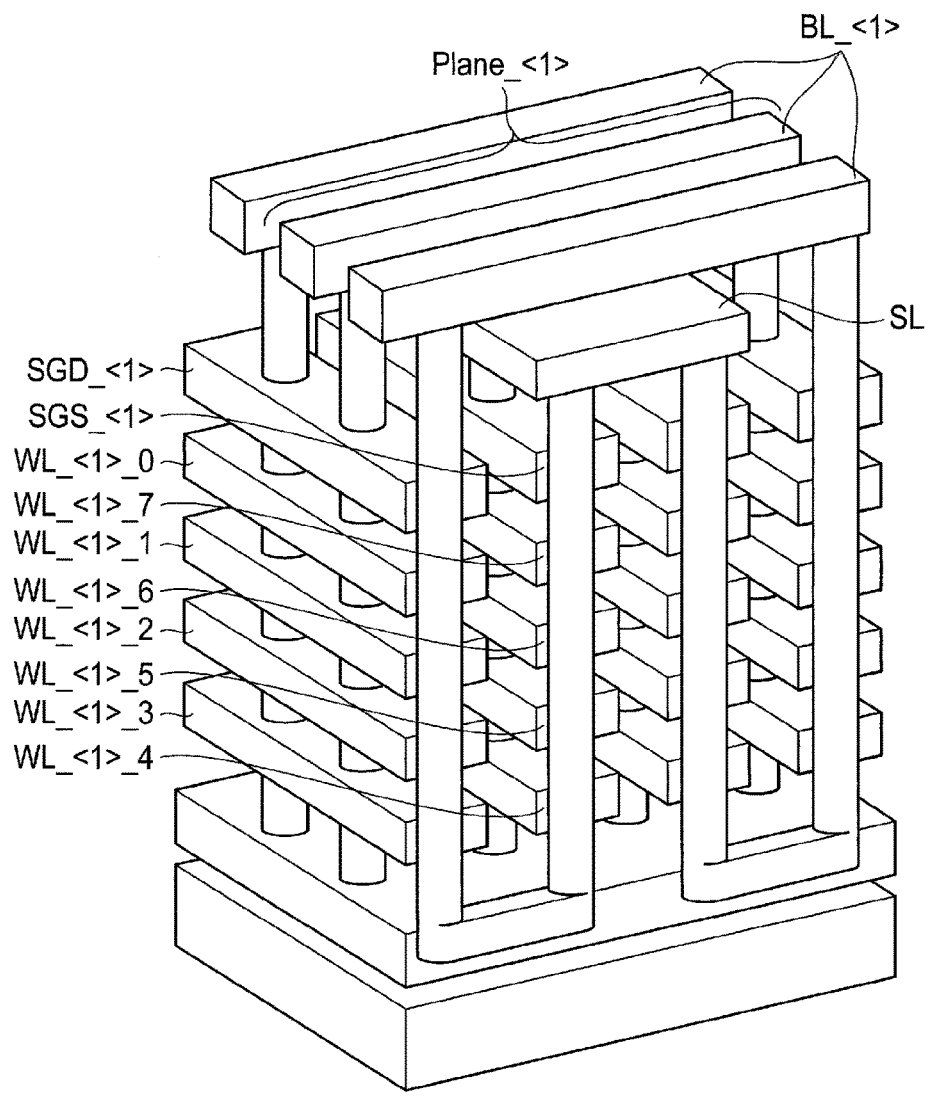
F I G. 5B

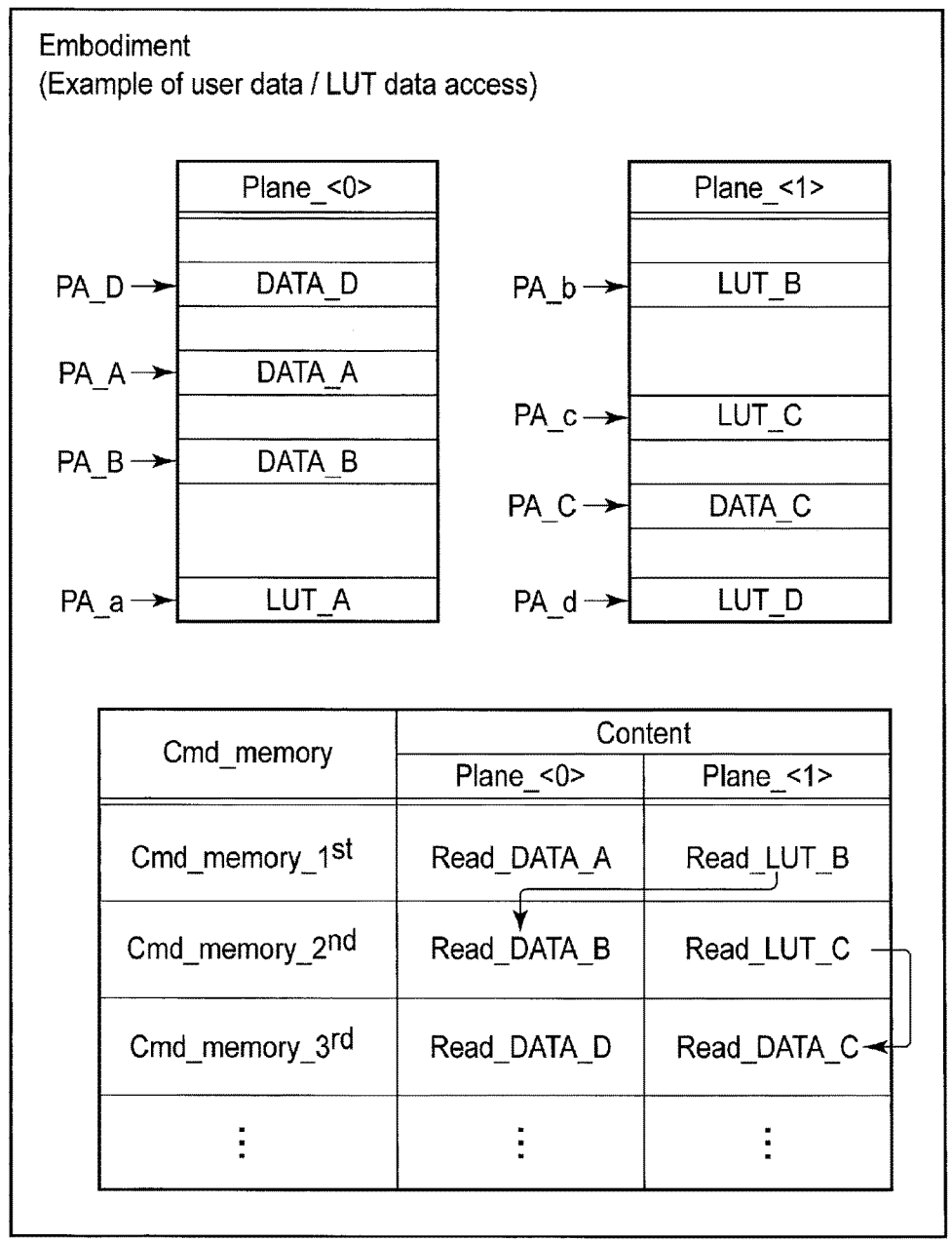
F I G. 6

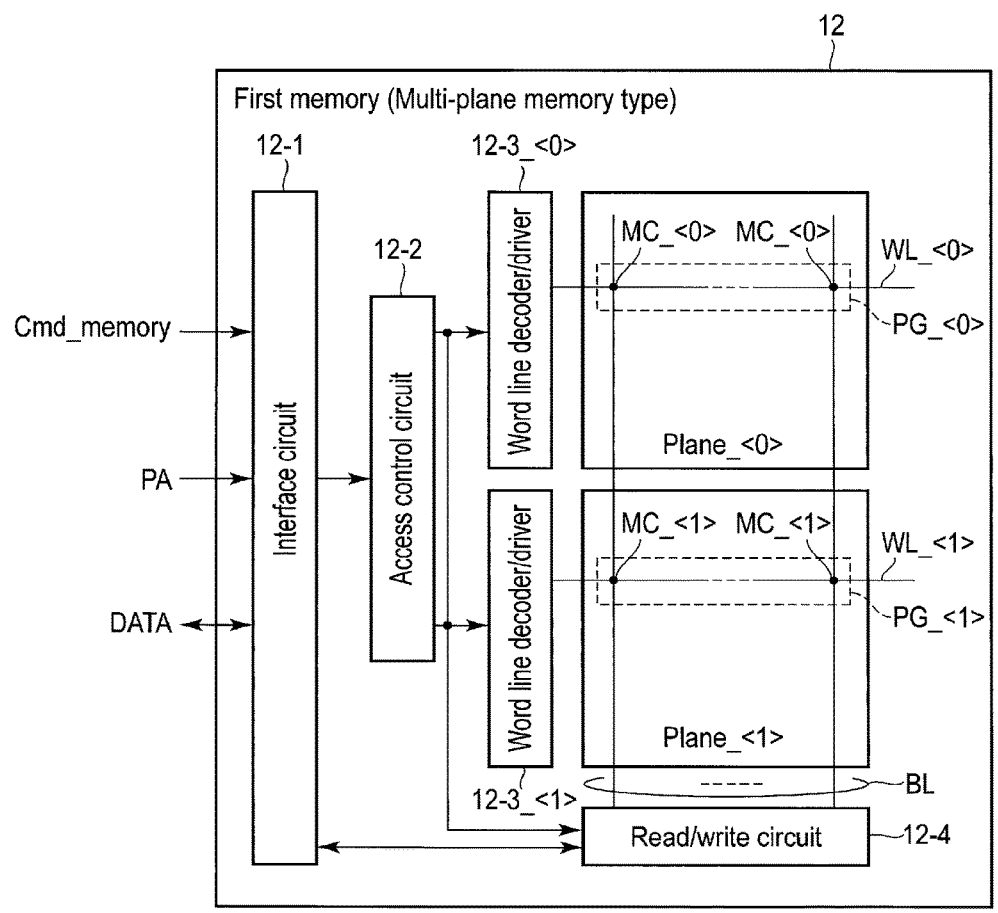
F I G. 7A

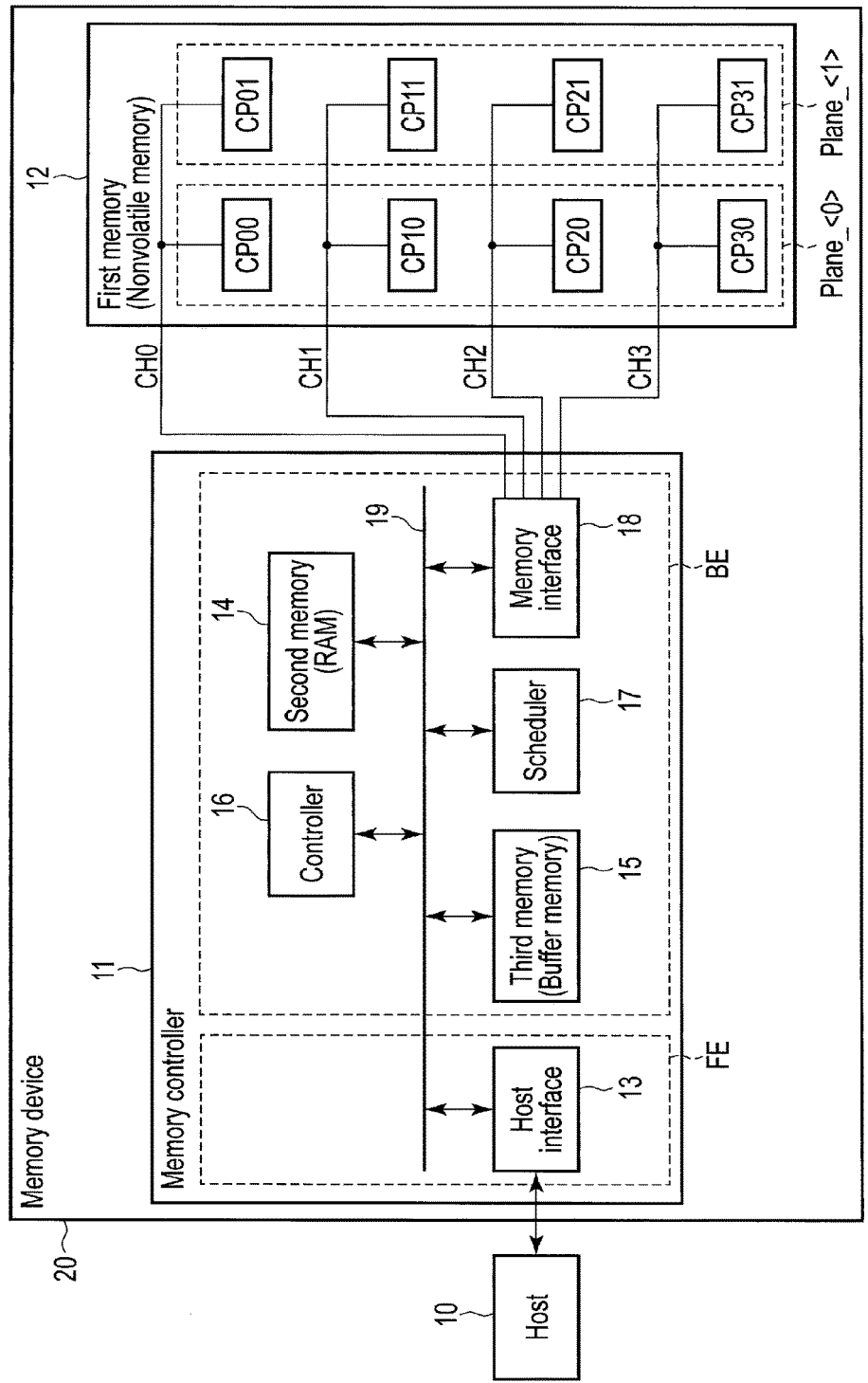
F I G. 9

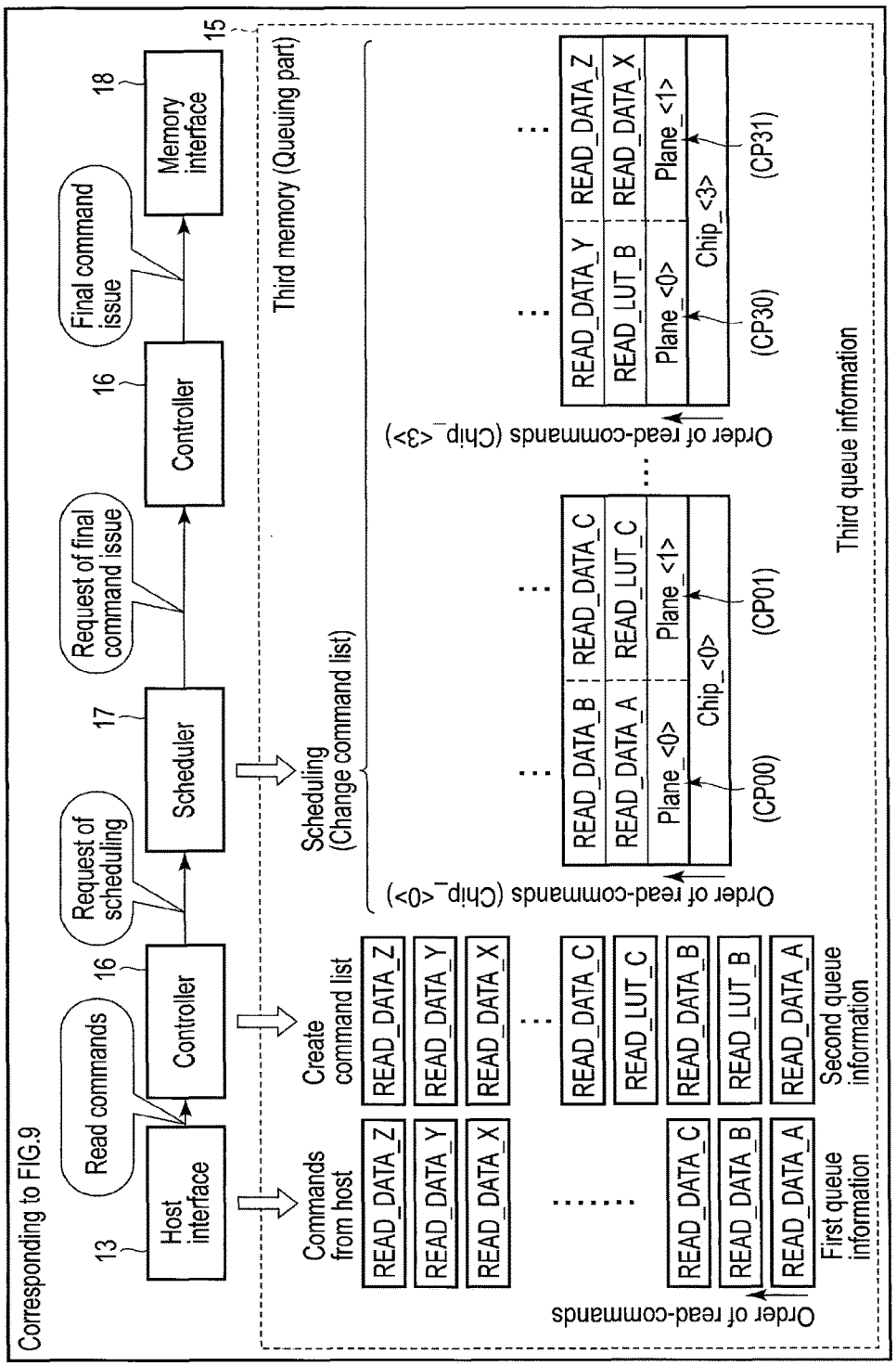
F I G. 13

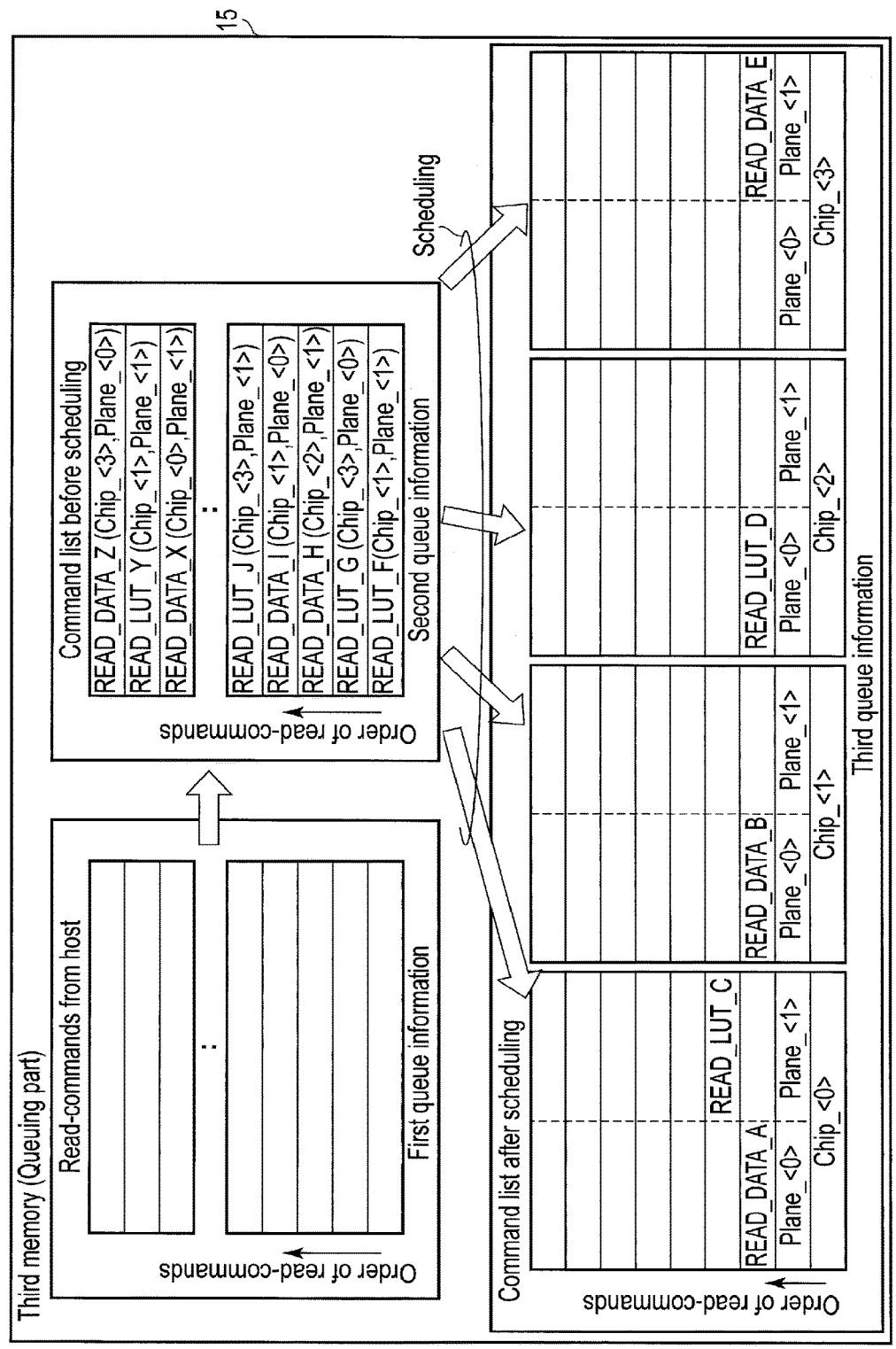
F I G. 16

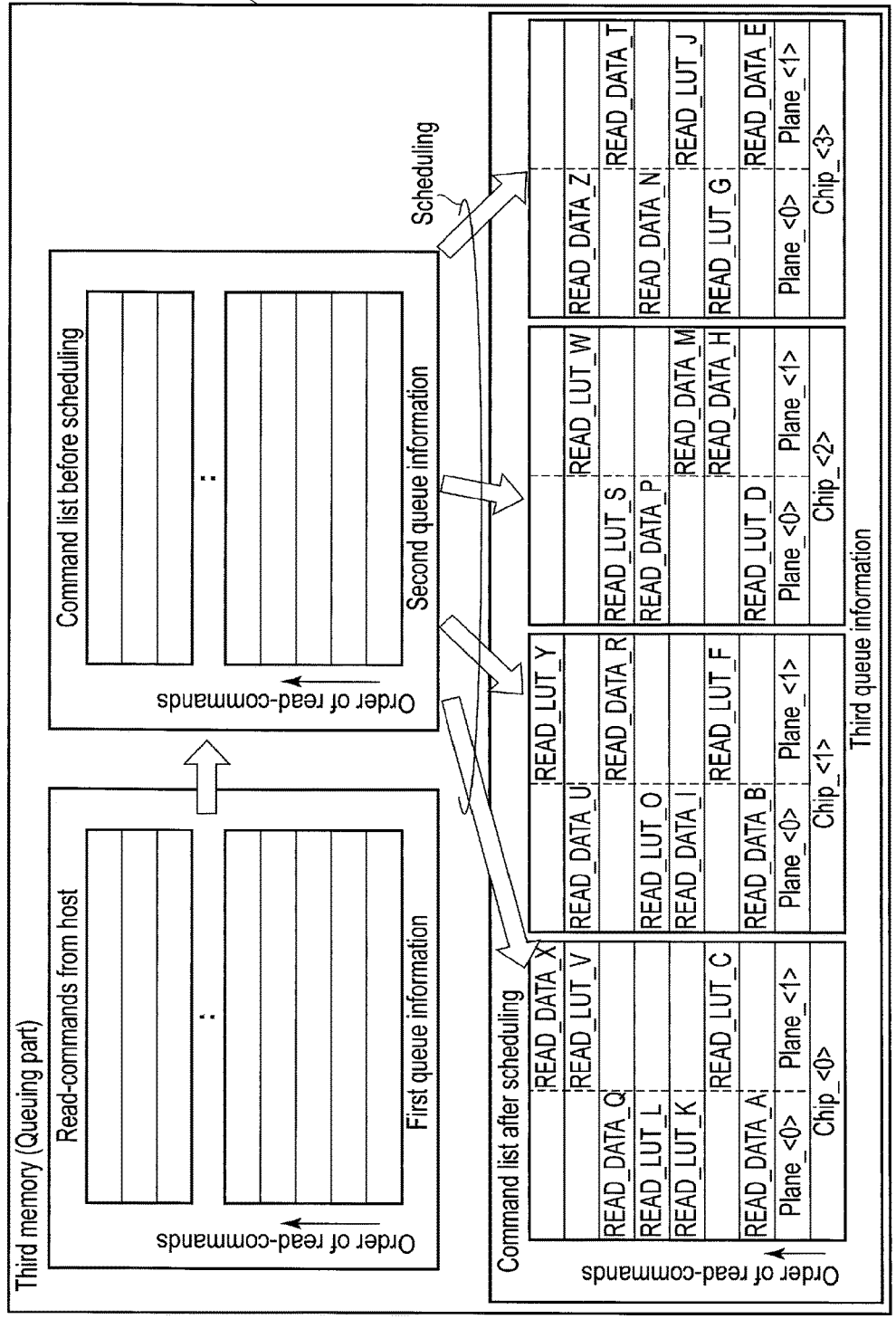
F I G. 17

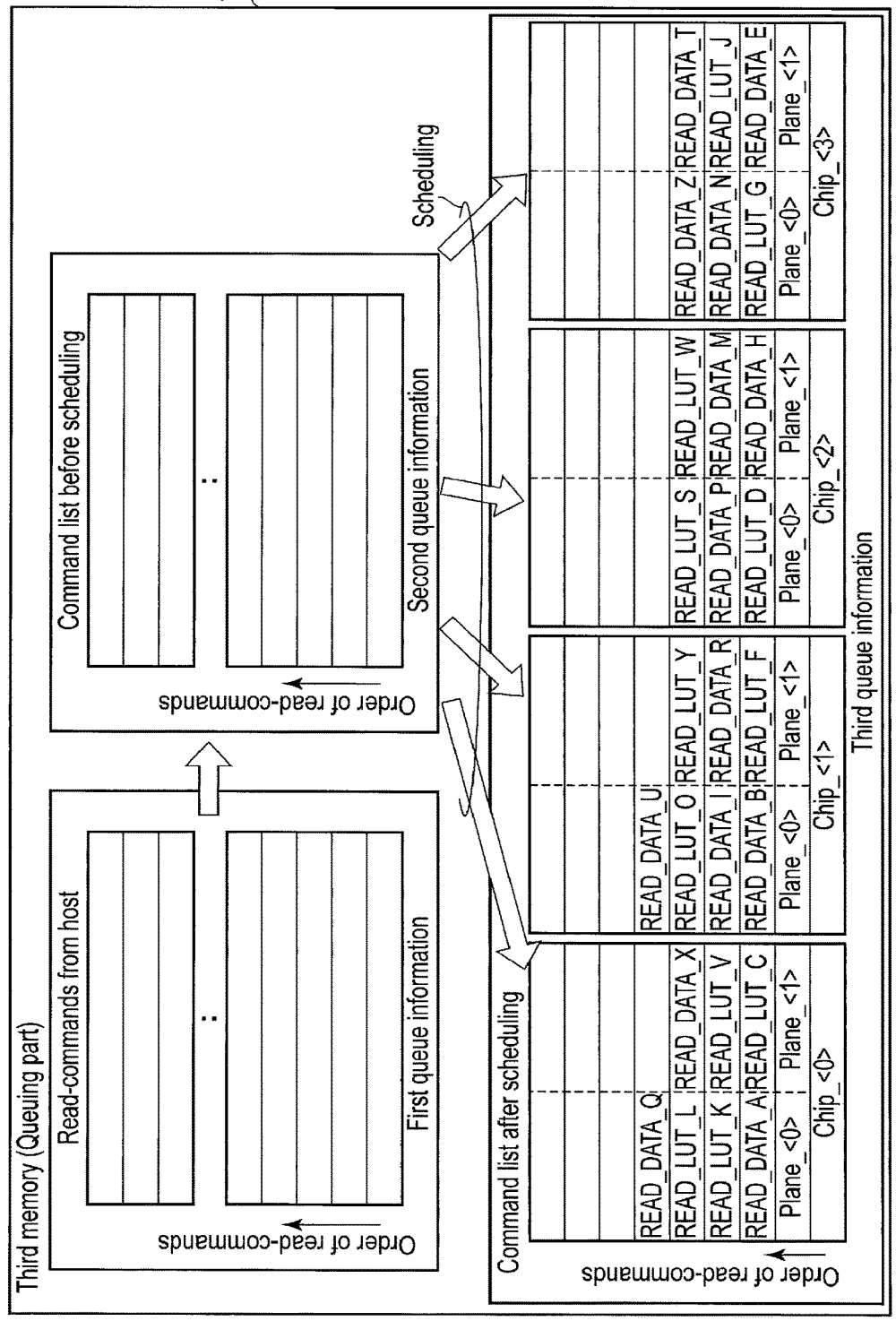
F I G. 19

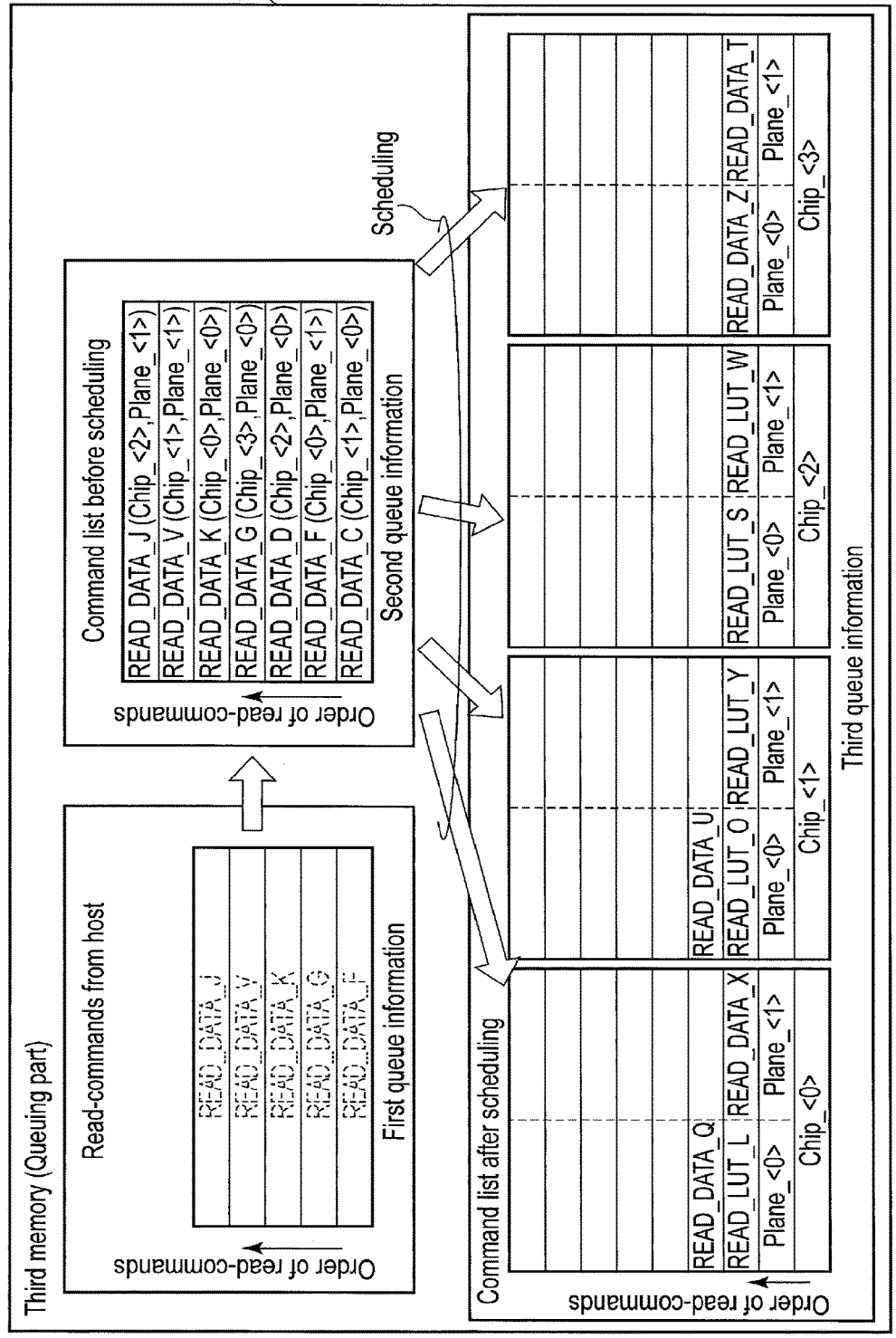
F I G. 21

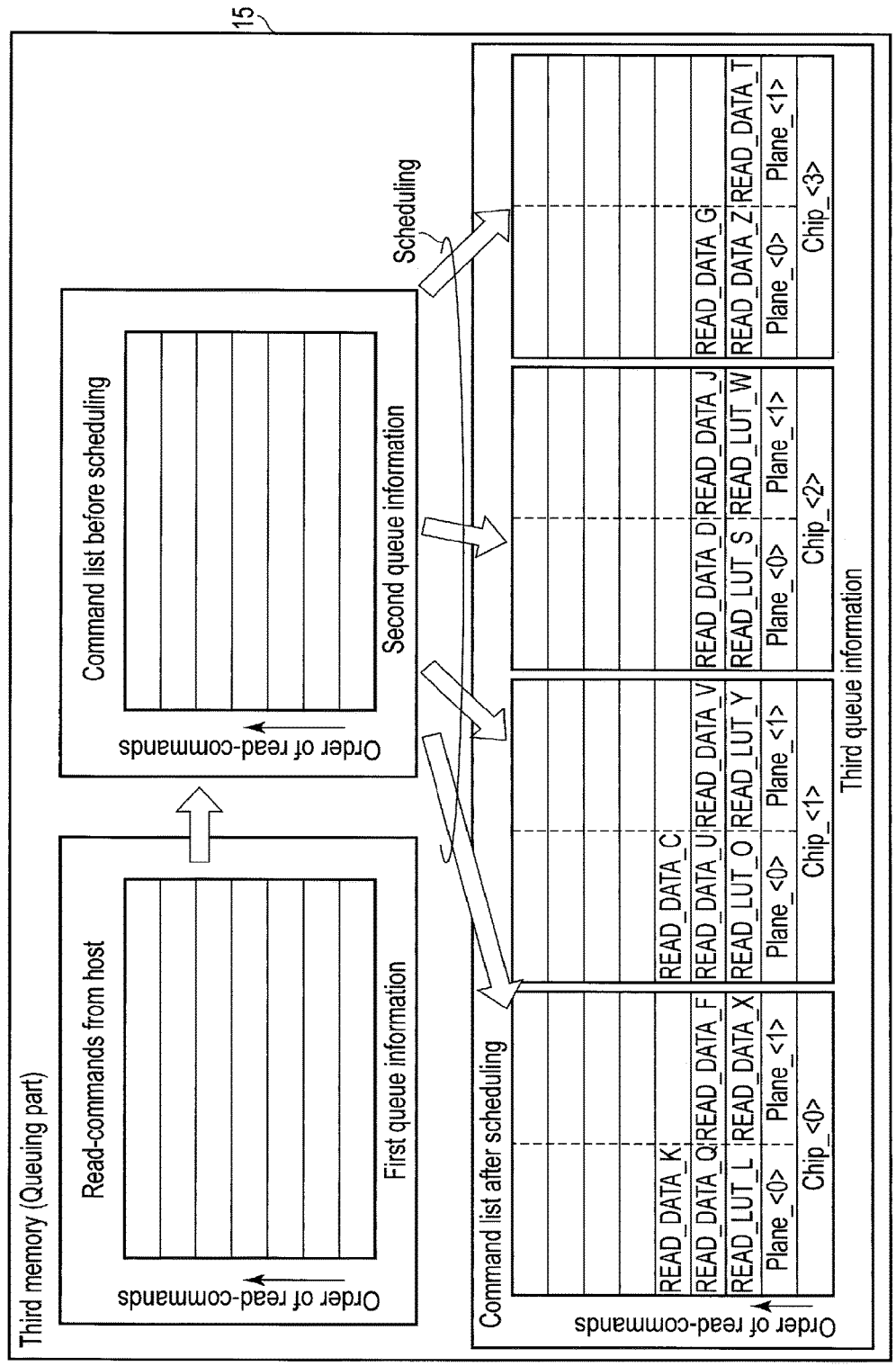
F I G. 24

F I G. 27

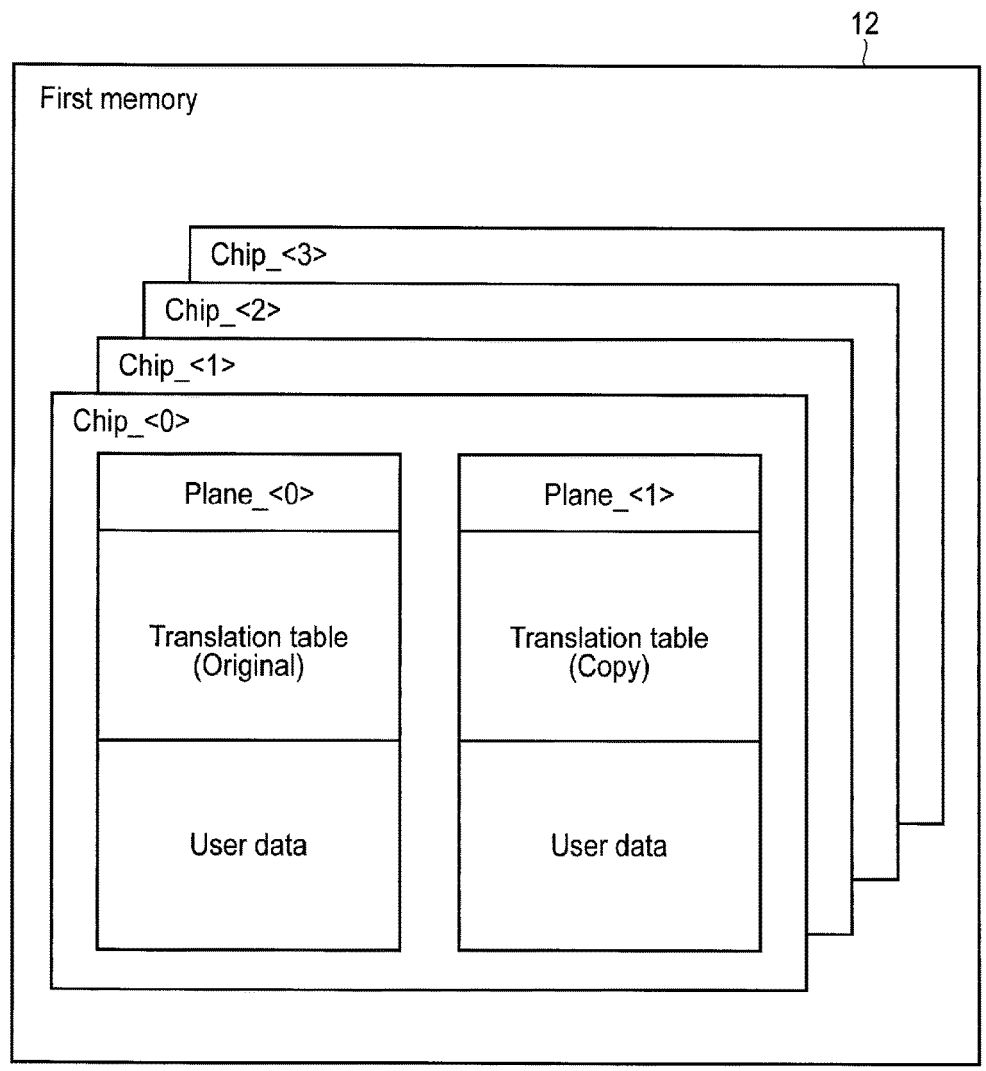
F I G. 28

Fourth example of scheduling (Third queue information)

| Chip_<0> | | Chip_<1> | | Chip_<2> | | Chip_<3> | |
|---|---|---|---|---|---|---|---|
| | READ_DATA_X | | READ_LUT_Y | | | | |
| | READ_LUT_V | READ_DATA_U | | | READ_LUT_W | | READ_DATA_T |
| READ_DATA_Q | | | READ_DATA_R | READ_LUT_S | | READ_DATA_Z | |
| READ_LUT_L | | READ_LUT_O | | READ_DATA_P | | READ_DATA_N | |
| READ_LUT_K | | READ_DATA_I | | | READ_DATA_M | | READ_LUT_J |
| | READ_LUT_C | | READ_LUT_F | READ_LUT_D | READ_DATA_H | READ_LUT_G | READ_DATA_E |
| READ_DATA_A | | READ_DATA_B | | | | | |
| Plane_<0> | Plane_<1> | Plane_<0> | Plane_<1> | Plane_<0> | Plane_<1> | Plane_<0> | Plane_<1> |

⇨ ⇨ ⇨ ⇨

| Chip_<0> | | Chip_<1> | | Chip_<2> | | Chip_<3> | |
|---|---|---|---|---|---|---|---|
| | READ_LUT_V | READ_DATA_U | | | | | |
| READ_DATA_L | READ_DATA_X | READ_LUT_Y | READ_DATA_R | READ_DATA_P | READ_LUT_W | READ_DATA_Z | READ_DATA_T |
| READ_DATA_Q | READ_LUT_K | READ_LUT_O | READ_DATA_I | READ_LUT_S | READ_DATA_M | READ_DATA_N | READ_LUT_J |
| READ_DATA_A | READ_LUT_C | READ_DATA_B | READ_LUT_F | READ_LUT_D | READ_DATA_H | READ_LUT_G | READ_DATA_E |
| Plane_<0> | Plane_<1> | Plane_<0> | Plane_<1> | Plane_<0> | Plane_<1> | Plane_<0> | Plane_<1> |

F I G. 30

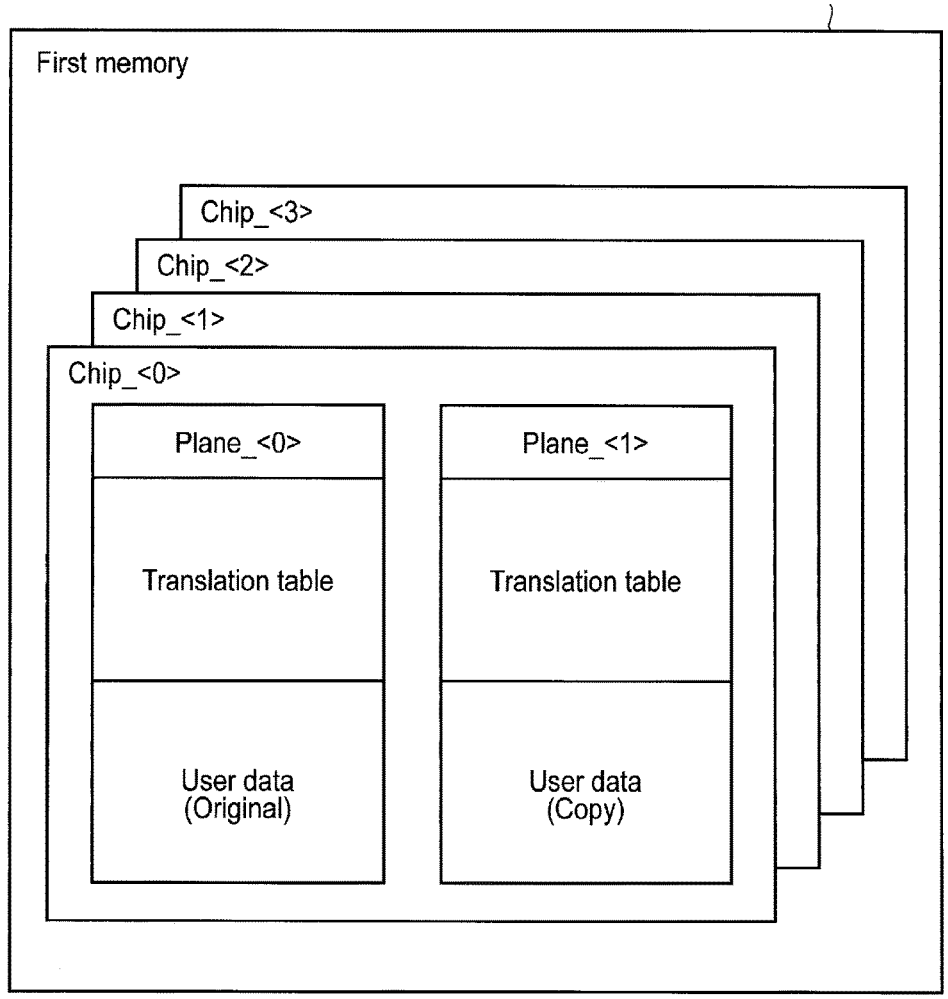
F I G. 31

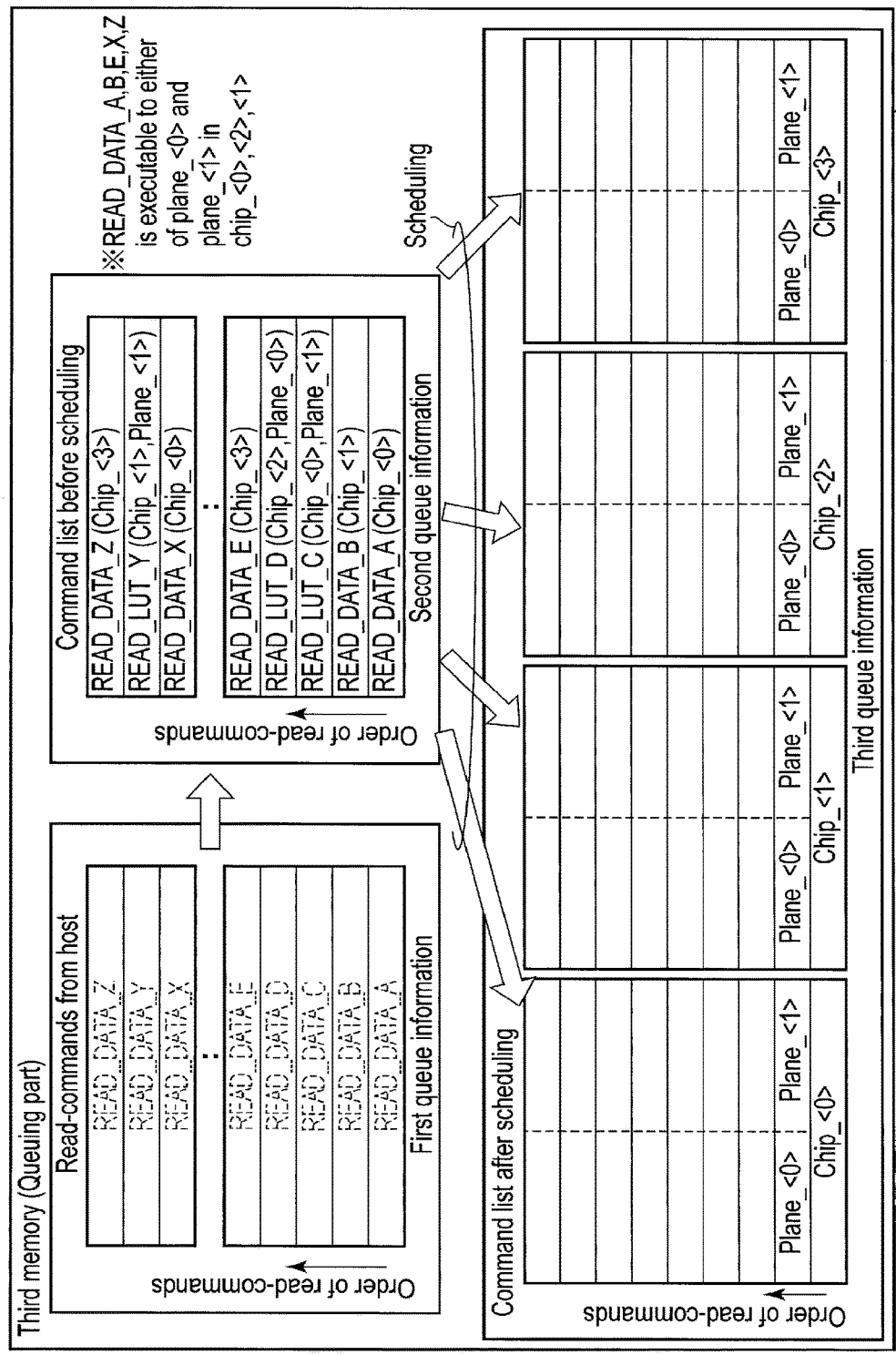
F I G. 32

MEMORY SYSTEM CAPABLE OF ACCESSING MEMORY CELL ARRAYS IN PARALLEL

CROSS-REFERENCE TO RELATED APPLICATIONS

This application claims the benefit of U.S. Provisional Application No. 62/306,493, filed Mar. 10, 2016, the entire contents of which are incorporated herein by reference.

FIELD

Embodiments described herein relate generally to a memory system.

BACKGROUND

A memory system comprising a nonvolatile memory and a controller configured to control the nonvolatile memory further comprises, for example, a random access memory (RAM) configured to store a translation table used for translating a logical address transferred from a host into a physical address. As the data capacity of the nonvolatile memory increases, the data size of the translation table increases proportionately.

BRIEF DESCRIPTION OF THE DRAWINGS

FIG. 1 is a diagram showing a memory system of an embodiment.

FIG. 3 is a diagram showing an example of the structure of a memory cell array.

FIG. 4 is a diagram showing the equivalent circuit of the structure of FIG. 3.

FIGS. 5A and 5B are diagrams showing the structures of a memory cell array.

FIG. 6 is a diagram showing a basic example of scheduling.

FIGS. 7A, 7B and 8 are diagram showing comparative examples.

FIGS. 9 and 10 are diagrams showing storage devices adopting the present embodiment.

FIGS. 13 and 14 are diagrams showing examples of command lists in a queuing part.

FIGS. 15 to 24 are diagrams showing an example of the procedure of scheduling.

FIG. 27 is a diagram showing a third example of scheduling.

FIG. 28 is a diagram showing a modification of the first memory.

FIG. 30 is a diagram showing a fourth example of scheduling.

FIG. 31 is a diagram showing another modification of the first memory.

FIG. 32 is a diagram showing the procedure of scheduling using the first memory of FIG. 31.

DETAILED DESCRIPTION

Figure 2:
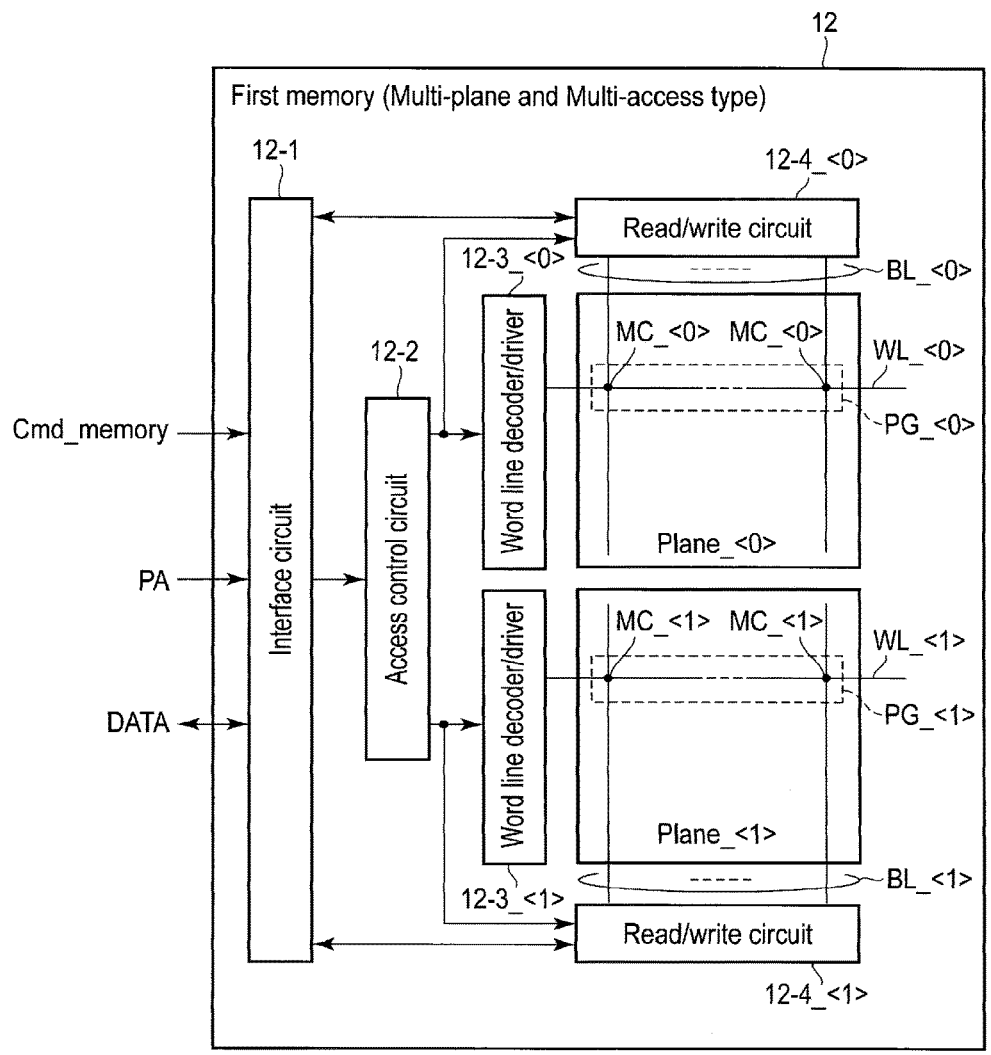
FIG. 2 is a diagram showing an example of a first memory.

In general, according to one embodiment, a memory system comprises: a first memory as a nonvolatile memory storing first data, second data as a translation table for accessing the first data, third data, fourth data as a translation table for accessing the third data, and including two memory cell arrays which are accessible in parallel; a second memory in which the second and fourth data is storable, and which stores a management table for managing information about whether the second and fourth data is stored in the second memory; a controller checking whether the second and fourth data is stored in the second memory based on the management table; a third memory storing an order of executing commands to be issued to the first memory; and a scheduler scheduling the order based on a result of the checking, two of a first command for reading the first data, a second command for reading the second data, a third command for reading the third data and a fourth command for reading the fourth data being executed in parallel in the order.

Embodiment

FIG. 1 shows a memory system of an embodiment.

The memory system comprises a host 10, a memory controller 11 and a first memory 12. The host 10 issues, for example, a command Cmd_host such as a read command or a write command. Further, the host 10 outputs, for example, a logical address LA as address data about a position in an address space under the control of the host 10.

The first memory 12 is a semiconductor memory serving as a nonvolatile storage and is, for example, a NAND flash memory. The first memory 12 may have a two-dimensional memory cell structure or may have a three-dimensional memory cell structure. The first memory 12 stores user data 12a and a translation table 12b showing the relationship between the logical address LA and a physical address PA in the first memory 12. The physical address PA is an address in the first memory 12.

The memory controller 11 comprises, for example, a host interface 13, a second memory 14, a third memory 15, a controller 16, a scheduler 17, a memory interface 18 and a bus connecting these elements to each other. The host interface 13 receives, for example, the command Cmd_host and the logical address LA from the host 10.

The second memory 14 is a volatile RAM serving as a cache memory such as a static random access memory (SRAM) or a synchronous dynamic random access memory (SDRAM). The second memory 14 may also be a nonvolatile RAM such as a magnetic random access memory (MRAM), a resistance random access memory (ReRAM) or a ferroelectric random access memory (FeRAM). The second memory 14 may be provided externally for the memory controller 11.

The second memory 14 stores, for example, a management table 14a and a translation table 14b. The translation table 14b is a part of the translation table 12b read from the first memory 12. It becomes possible to execute high-speed translation of the logical address LA into the physical address PA by providing the translation table 14b in the second memory 14.

Further, the translation table 14b is a copy of a part of the translation table 12b stored in the first memory 12. Since the translation table 12b of the first memory 12 is not entirely copied into the second memory 14, the data size of the translation table 14b in the second memory 14 can be reduced. That is, even if the memory capacity of the storage, namely, the first memory 12 increases and the data size of the translation table 12b increases proportionately, the second memory 14 will not require greater memory capacity, and thus the cost of the memory system can be reduced.

Since the translation table 14b is a copy of a part of the translation table 12b, the management table 14a is provided in the second memory 14. For example, the management table 14a manages information about whether the translation table 12b of the first memory 12 of each of data (user data 12b) DATA_A, DATA_B, DATA_C, DATA_D and DATA_E stored in the first memory 12 is read into the second memory 14 or not.

Here, each of data DATA_A, DATA_B, DATA_C, DATA_D and DATA_E is not necessarily any particular data unit. For example, each data DATA_A, DATA_B, DATA_C, DATA_D and DATA_E may be an address space (namespace) transferred from the host 10 or may be a read/write operation unit (region) in the first memory 12.

To manage information about whether the translation table 12a of the first memory 12 is read into the second memory 14 or not, the management table 14a stores the relationship between the physical address PA of the translation table 12b and a cache address CA of the translation table 14b for each of data DATA_A, DATA_B, DATA_C, DATA_D and DATA_E. The physical address PA of the translation table 12b is an address of the translation table 12b in the first memory 12. The cache address CA of the translation table 14b is an address of the translation table 14b in the second memory 14.

For example, the management table 14a contains both the physical addresses and the cache addresses of data DATA_A, DATA_D and DATA_E respectively as physical addresses PA_a, PA_d and PA_e and cache addresses CA_a, CA_d and CA_e. It means that the translation table of data DATA_A, DATA_D and DATA_E (translation table at physical addresses PA_a, PA_d and PA_e) 12b is read (copied) into cache addresses CA_a, CA_d and CA_e of the second memory 14.

Therefore, the translation table 14b stores the relationship between a logical address LA-A and a physical address PA_A for data DATA_A, the relationship between a logical address LA_D and a physical address PA_D for data DATA_D, and the relationship between a logical address LA_E and a physical address PA_E for data DATA_E. That is, data DATA_A, DATA_D and DATA_E can be read immediately from the first memory 12 with reference to the translation table 14b of the second memory 14.

On the other hand, the management table 14a does not contain cache addresses corresponding to physical addresses PA_b and PA_c for data DATA_B and DATA_C. It means that the translation table of data DATA_B and DATA_C (translation table at physical addresses PA_b and PA_c) 12b is not read (copied) into the second memory 14.

Therefore, for example, when data DATA_B is to be read from the first memory 12, firstly, the translation table (showing the relationship between a logical address LA_B and a physical address PA_B) 12b of data DATA_B is read from physical address PA_b of the first memory 12 and copied into a cache address CA_b of the second memory as the translation table 14b of data DATA_B. Further, cache address CA_b is also stored in the management table 14a, and the management table 14a is updated.

After that, data DATA_B can be read from the first memory 12 with reference to the translation table 14b of the second memory 14.

The third memory 15 is, for example, a buffer memory which stores data temporarily and functions as a queuing part for queuing commands Cmd_host transferred from the host 10.

The controller 16 controls read/write operations in the first memory 12 based on read/write commands received from the host 10.

For example, the controller 16 generates second queue information based on a plurality of read commands (first queue information) queued in the third memory 15. The second queue information includes a data read command to read user data 12a from the first memory 12 and a table read command to read the translation table 12b from the first memory 12.

The data read command is a read command which is issued when the translation table 14b of data corresponding to the read command from the host 10 is stored in the second memory 14, and includes a physical address used for accessing the user data 12a. The table read command is a command which is issued when the translation table 14b of data corresponding to the read command from the host 10 is not stored in the second memory 14, and includes a physical address used for accessing the translation table 12b of the data.

The scheduler 17 schedules these commands such that the data read commands and the table read commands in the second queue information are executable efficiently.

That is, in the present embodiment, only a part of the translation table 12b is copied into the second memory 14, and the memory capacity of the second memory 14 is thereby reduced. Further, in a case where the translation table 14b of data corresponding to the read command from the host 10 is not stored in the second memory 14, firstly, the translation table 12b of the data needs to be read from the first memory 12.

Therefore, the scheduler 17 reviews the execution order of the data read commands and the table read commands based on the second queue information, and generates third queue information including the data read commands and the table read commands rearranged in an optimum execution order.

The controller 16 or the scheduler 17 issues a final command Cmd_memory to the first memory 12 based on the third queue information.

The memory interface 18 outputs the final command Cmd_memory and the physical address PA to the first memory 12.

In generating the third queue information, for example, the scheduler 17 schedules the read commands such that the data read commands and the table read commands are executable in parallel. In this way, it is possible to prevent a decrease in the throughput of the read operation of the read data (user data) induced by the read operation of the translation table 12b from the first memory 12. Therefore, the first memory 12 is preferably a memory (multi-access memory) in which a plurality of memory cells are accessible in parallel.

For example, the structure of the first memory 12 has been shifting from a two-dimensional structure to a three-dimensional structure promising greater memory capacity. Therefore, a multi-plane NAND flash memory is one of desirable candidates for the first memory 12.

Therefore, in the following description, the first memory 12 is assumed to be a multi-plane, multi-access NAND flash memory applicable to the memory system of the present embodiment and in which a plurality of planes are accessible in parallel, more specifically, in which a plurality of memory cells connected to a plurality of different word lines are accessible in parallel.

FIG. 2 shows an example of the first memory.

The first memory 12 is a multi-plane, multi-access NAND flash memory configured to access a plurality of memory cells MC_<0> and MC_<1> connected to a plurality of different word lines WL_<0> and WL_<1>.

The final commands Cmd_memory and the physical addresses PA are input to an interface circuit 12-1. An access control circuit 12-2 controls access operations of a plurality of memory cell arrays (two memory cell arrays in the present embodiment) Plane_<0> and Plane_<1> based on the physical addresses PA. The access operations of memory cell arrays Plane_<0> and Plane_<1> are executed in parallel.

For example, based on an access signal from the access control circuit 12-2, a word line decoder/driver 12-3_<0> and a read/write circuit 12-4_<0> access memory cells MC_<0> in memory cell array Plane_<0>. That is, word line decoder/driver 12-3_<0> selects one word line WL_<0> in memory cell array Plane_<0>. In the mean time, read/write circuit 12-4_<0> executes a read/write operation on one page PG_<0> (a plurality of memory cells MC_<0>) connected to one word line WL_<0> via a plurality of bit lines BL_<0>.

Further, based on an access signal from the access control circuit 12-2, a word line decoder/driver 12-3_<1> and a read/write circuit 12-4_<1> access memory cells MC_<1> in memory cell array Plane_<1>. That is, word line decoder/driver 12-3_<1> selects one word line WL_<1> in memory cell array Plane_<1>. In the mean time, read/write circuit 12-4_<1> executes a read/write operation on one page PG_<1> (a plurality of memory cells MC_<1>) connected to one word line WL_<1> via a plurality of bit lines BL_<1>.

The data DATA is transferred between the interface circuit 12-1 and read/write circuits 12-4_<0> and 12-4_<1>.

FIG. 3 shows an example of the structure of the memory cell array. FIG. 4 shows the equivalent circuit of the structure of FIG. 3.

In these drawings, memory cell arrays Plane_<0> and Plane_<1> correspond respectively to memory cell arrays Plane_<0> and Plane_<1> of FIG. 2.

Memory cell array Plane_<0> comprises a memory string NAND_<0> including a plurality of memory cells (flash memory cells) connected in series. One end of memory string NAND_<0> is connected to a source line SL via a select transistor TS_<0>, while the other end of memory string NAND_<0> is connected to bit line BL_<0> via a select transistor TD_<0>.

In memory cell array Plane_<0>, all memory string NAND_<0> and select transistors TS_<0> and TD_<0> are field effect transistors (FETs), and their gate electrodes are connected respectively to word lines WL_<0>_0, WL_<0>_1, . . . , WL_<0>_7 and select gate lines SGS_<0> and SGD_<0>.

Memory cell array Plane_<1> comprises a memory string NAND_<1> including a plurality of memory cells (flash memory cells) connected in series. One end of memory string NAND_<1> is connected to a source line SL via a select transistor TS_<1>, while the other end of memory string NAND_<1> is connected to bit line BL_<1> via a select transistor TD_<1>.

In memory cell array Plane_<1>, all memory string NAND_<1> and select transistors TS_<1> and TD_<1> are field effect transistors (FETs), and their gate electrodes are connected respectively to word lines WL_<1>_0, WL_<1>_1, . . . , WL_<1>_7 and select gate lines SGS_<1> and SGD_<1>.

The characteristics of this structure is that bit line BL_<0> connected to memory cell array Plane_<0> and bit line BL_<1> connected to memory cell array Plane_<1> are different from each other. Therefore, according to this structure, it is possible to execute selection of word lines WL_<0>_0, WL_<0>_1, . . . , WL_<0>_7 in memory cell array Plane_<0> and selection of word lines WL_<1>_0, WL_<1>_1, . . . , WL_<1>_7 in memory cell array Plane_<1> independently.

That is, it is possible to access a plurality of memory cells connected to a plurality of different word lines in parallel.

Note that, as shown in FIGS. 5A and 5B, memory cell arrays Plane_<0> and Plane_<1> may also be completely independent from each other. That is, each of memory cell arrays Plane_<0> and Plane_<1> may be a memory core configured to be capable of executing a read/write operation independently.

FIG. 6 shows an example of scheduling.

The scheduling which will be described below is the scheduling by the scheduler 17 of FIG. 1 and the scheduling for a case where the first memory 12 of FIG. 1 is configured to be capable of accessing a plurality of memory cells connected to a plurality of different word lines.

Further, the following description is based on the assumption that data (user data) DATA_A, DATA_B and DATA_D is stored respectively at physical addresses PA_A, PA_B and PA_D in memory cell array Plane_<0>, data (LUT data) LUT_A is stored at physical address PA_a in memory cell array Plane_<0>, data (user data) DATA_C is stored at physical address PA_C in memory cell array Plane_<1>, and data (LUT data) LUT_B, LUT_C and LUT_D is stored respectively at physical addresses PA_b, PA_c and PA_d in memory cell array Plane_<1>.

Here, the LUT (look-up table) data is data including a translation table. For example, data LUT_A, LUT_B, LUT_C and LUT_D is data showing the translation table of data DATA_A, DATA_B, DATA_C and DATA_D, respectively.

Under the assumption, as described with reference to FIG. 1, a case where the translation table 12b of data DATA_A and DATA_D is already read from the first memory 12 into the second memory 14 as the translation table 14b and the commands Cmd_host to read data DATA_A, DATA_B, DATA_C and DATA_D are issued from the host 10 will be considered.

In this case, the controller 16 of FIG. 1 firstly generates, based on the first queue information (commands Cmd_host to read data DATA_A, DATA_B and DATA_C), the second queue information including a read command READ_DATA_A of data DATA_A, a read command READ_DATA_D of data DATA_D, a read command READ_LUT_B of data LUT_B, a read command READ_LUT_C of data LUT_C, and a read command READ_DATA_B of data DATA_B, and a read command READ_DATA_C of data DATA_C.

The scheduler 17 of FIG. 1 schedules these commands based on the second queue information to execute data read commands READ_DATA_A, READ_DATA_B, READ_DATA_C and READ_DATA_D and table read commands READ_LUT_B and READ_LUT_C efficiently (in the shortest possible time). More specifically, the scheduler 17 of FIG. 1 generates the third queue information including these commands scheduled to be executable in parallel.

For example, as shown in FIG. 6, the third queue information includes read command READ_DATA_A to read data DATA_A in memory cell array Plane_<0> and read command READ_LUT_B to read data LUT_B in memory cell array Plane_<1> as the first final command Cmd_memory_$1^{st}$ to be issued firstly to the first memory. That is, data DATA_A and data LUT_B are read from the first memory in parallel.

Then, data DATA_A is transferred to the host via the host interface, while data LUT_B is stored in the second memory.

Further, the third queue information includes read command READ_DATA_B to read data DATA_B in memory cell array Plane_<0> and read command READ_LUT_C to read data LUT_C in memory cell array Plane_<1> as the second final command Cmd_memory_$2^{nd}$ to be issued secondly to the first memory. That is, data DATA_B and data LUT_C are read from the first memory in parallel.

Then, data DATA_B is transferred to the host via the host interface, while data LUT_C is stored in the second memory.

Still further, the third queue information includes read command READ_DATA_D to read data DATA_D in memory cell array Plane_<0> and read command READ_DATA_C to read data DATA_C in memory cell array Plane_<1> as the third final command Cmd_memory_$3^{rd}$ to be issued thirdly to the first memory. That is, data DATA_C and data DATA_D are read from the first memory in parallel.

Then, data DATA_C and DATA_D is transferred to the host via the host interface.

In this way, it is possible to read data (user data) DATA_A, DATA_B, DATA_C and DATA_D by issuing the final command Cmd_memory three times from the memory controller to the first memory, that is, in three read operation cycles. Therefore, even if the translation table is not entirely read from the first memory to the second memory, the throughput of the read operation of user data will not decrease.

Figure 7B:
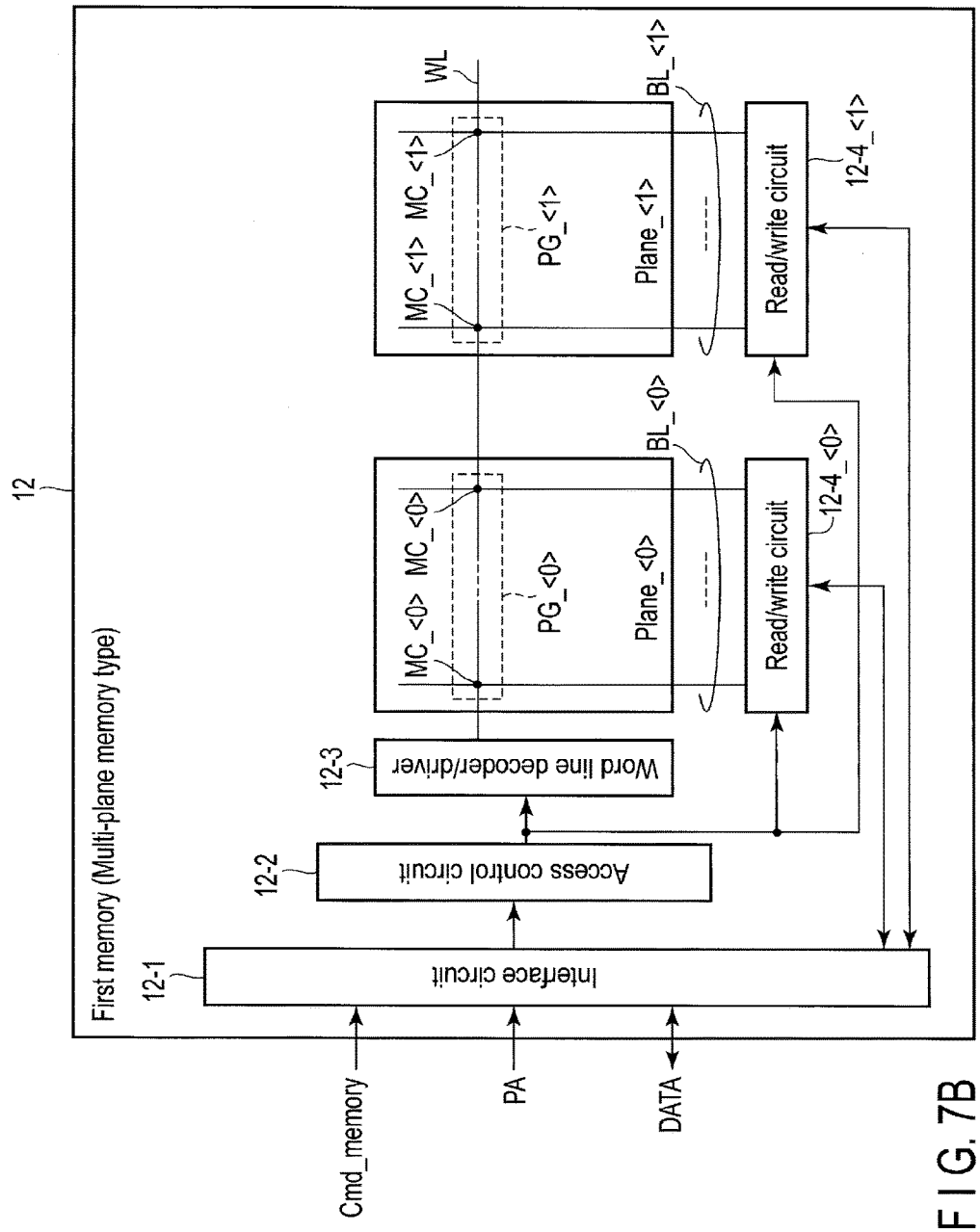
Figure 8:
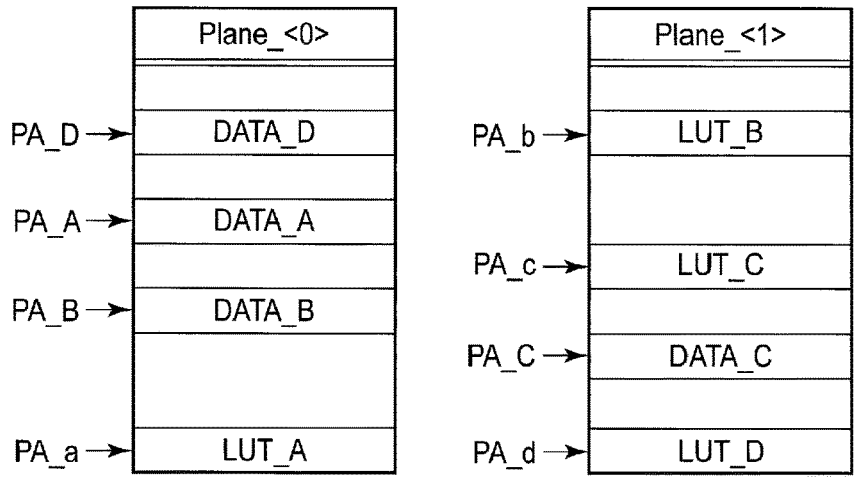

FIGS. 7A, 7B and 8 show comparative examples.

FIGS. 7A and 7B correspond to FIG. 2, and FIG. 8 corresponds to FIG. 6. In FIGS. 7A, 7B and 8, elements the same as those of FIGS. 2 to 6 will be denoted by the same reference symbols and detailed description thereof will be omitted.

The comparative examples are different from the above-described example in that a plurality of memory cell array Plane_<0> and Plane_<1> cannot execute read/write operations independently.

For example, in the case of FIG. 7A, the same bit lines BL are shared between memory cell arrays Plane_<0> and Plane_<1> and are connected to a single read/write circuit 12-4. In this case, it is impossible to access a plurality of memory cells MC_<0> and MC_<1> connected to a plurality of different word lines WL_<0> and WL_<1> in parallel.

Further, in the case of FIG. 7B, the same word lines WL are shared between memory cell arrays Plane_<0> and Plane_<1>. In this case also, it is impossible to access a plurality of memory cells MC_<0> and MC_<1> connected to a plurality of different word lines WL_<0> and WL_<1> in parallel.

Therefore, for example, as shown in FIG. 8, it is necessary to issue the final command Cmd_memory six times from the memory controller to the first memory to read data (user data) DATA_A, DATA_B, DATA_C and DATA_D. Consequently, even if the translation table is not entirely read from the first memory to the second memory and the memory capacity of the second memory is thereby reduced, the throughput of the read operation of the user data will decrease.

Note that, in the above-described embodiment, the controller 16 and the scheduler 17 of FIG. 1 may be realized either as hardware or as software executable by a CPU in the memory controller 11 or may also be realized as the combination of the two.

Whether the processing of the controller 16 and the scheduler 17 of FIG. 1 is realized by hardware, software, or the combination of the two depends on environments of the memory system of the present embodiment, design constraints on the memory system, and the like. Note that, although a skilled person can appropriately employ various methods to realize the processing of the controller 16 and the scheduler 17 by hardware or software, for example, according to the actual manners of implementing the embodiment, all the implemented processing falls within the scope of the present embodiment.

Application Example

A storage device adopting the memory system of the above-described embodiment will be described below.

Figure 10:
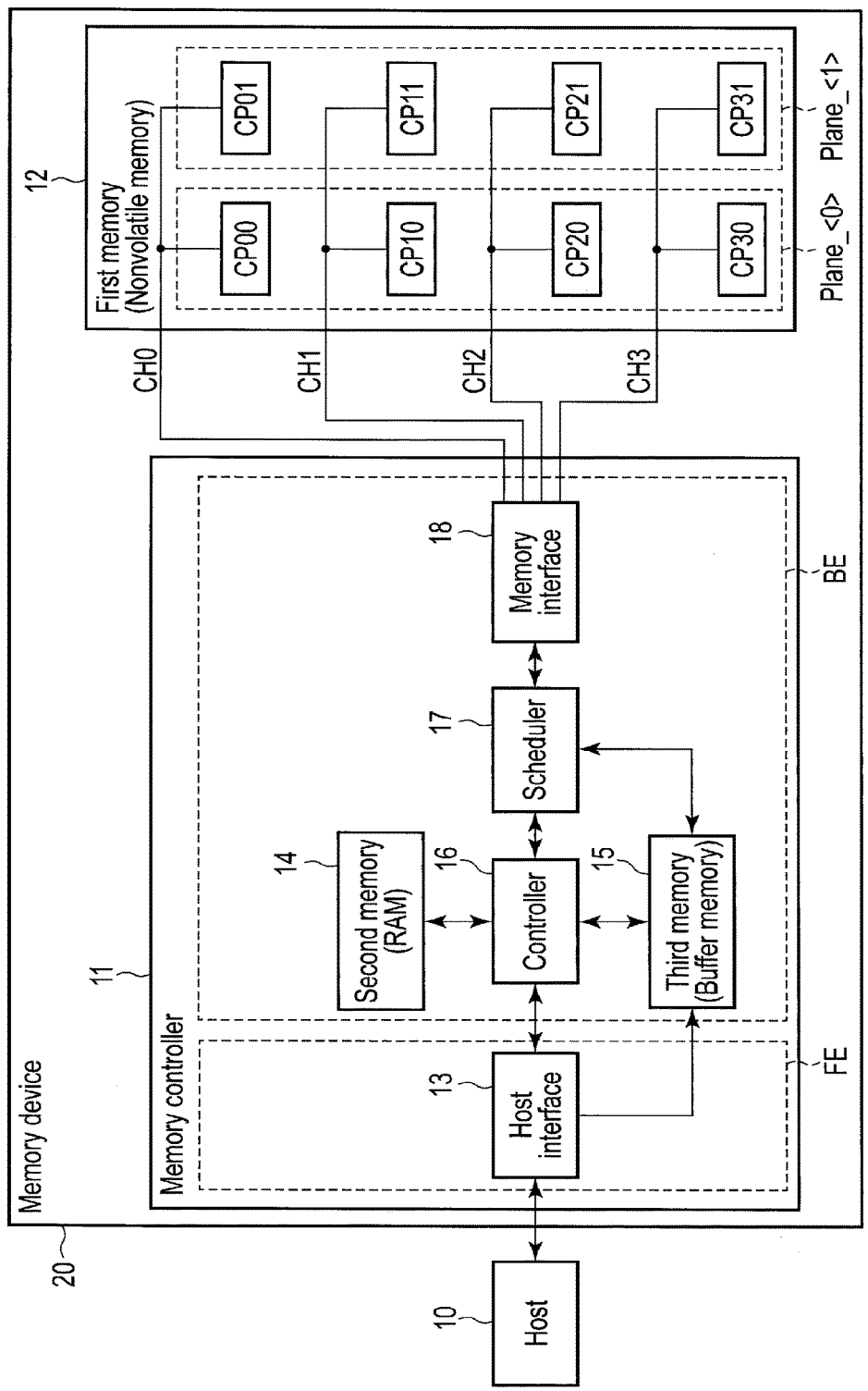

FIGS. 9 and 10 show storage devices as examples of application of the embodiment.

A storage device 20 is a device connectable to the host 10, and is for example, a solid-state drive (SSD), a USS flash drive, a memory card or the like. The host 10 is an electronic device such as a personal computer or a mobile device (more specifically, a processor or the like in the electronic device). The host 10 may also be an imaging device such as a digital still camera or a video camera, or may also be a tablet computer, a smartphone, a game console, a car navigation system, a printer, a scanner, a server system or the like.

The storage device 20 comprises a first memory (nonvolatile memory) 12 and a memory controller 11 configured to control the first memory 12.

The first memory 12 comprises a plurality of channels (four channels in the present embodiment) CH0, CH1, CH2 and CH3 and a plurality of memory cell arrays (two memory cell arrays in the present embodiment) Plane_<0> and Plane_<1>. Memory cell arrays Plane_<0> and Plane_<1> are configured to execute access operations in parallel as described above.

Each of channels CH0, CH1, CH2 and CH3 is also configured to execute a parallel access operation. For example, when one channel CH0 executes a read/write operation, the other three channels CH1, CH2 and CH3 can execute read/write operations in parallel. In this way, according to the storage device adopting the embodiment, it is possible to execute the parallel operation of memory cell arrays Plane_<0> and Plane_<1> as well as the parallel operation of channels CH0, CH1, CH2 and CH3.

Note that a reference symbol CPxy indicates a memory cell array Plane_<y> in channel CHx. For example, a reference symbol CP00 indicates memory cell array Plane_<0> in channel CH0, and a reference symbol CP01 indicates memory cell array Plane_<1> in channel CH0.

The memory controller 11 controls a read/write operation on the first memory 12. The memory controller 11 comprises a front end FE and a back end BE.

The front end FE is configured to receive a read/write command from the host 10 and to notify completion of a read/write command to the host 10. The front end FE includes a host interface 13.

The back end BE is configured to control a read/write operation on the first memory 12. The back end BE comprises a second memory (RAM) 14, a third memory (buffer memory) 15, a controller 16, a scheduler 17, and a memory interface 18.

The first memory 12, the host interface 13, the second memory 14, the third memory 15, the controller 16 and the schedule 17 are similar to those described in the embodiment (corresponding to FIGS. 1-8), and thus detailed descriptions thereof will be omitted.

In the example of FIG. 9, the front end FE and the back end BE are connected to each other via a bus 19. In the example of FIG. 9, for example, a final command is issued from the controller 16. In the example of FIG. 10, the controller 16 and the scheduler 17 are connected in series between the host interface 13 and the memory interface 18. In the example of FIG. 10, for example, a final command is issued from the scheduler 17.

Note that the controller 16 may include an error correction part configured to execute error correction using Reed-Solomon (RS) coding, Bose-Chaudhuri-Hocquenghem (BCH) coding, low-density parity-check (LDPC) coding or the like.

For example, when the front end FE receives a write command from the host 10, the controller 16 encodes the user data transferred from the host 10 and then transfers the encoded data as write data to the first memory 12. Further, when data is read from the first memory 12, the controller 16 decodes the read data. When there is an error in the read data, the controller 16 corrects the error.

Figure 11:
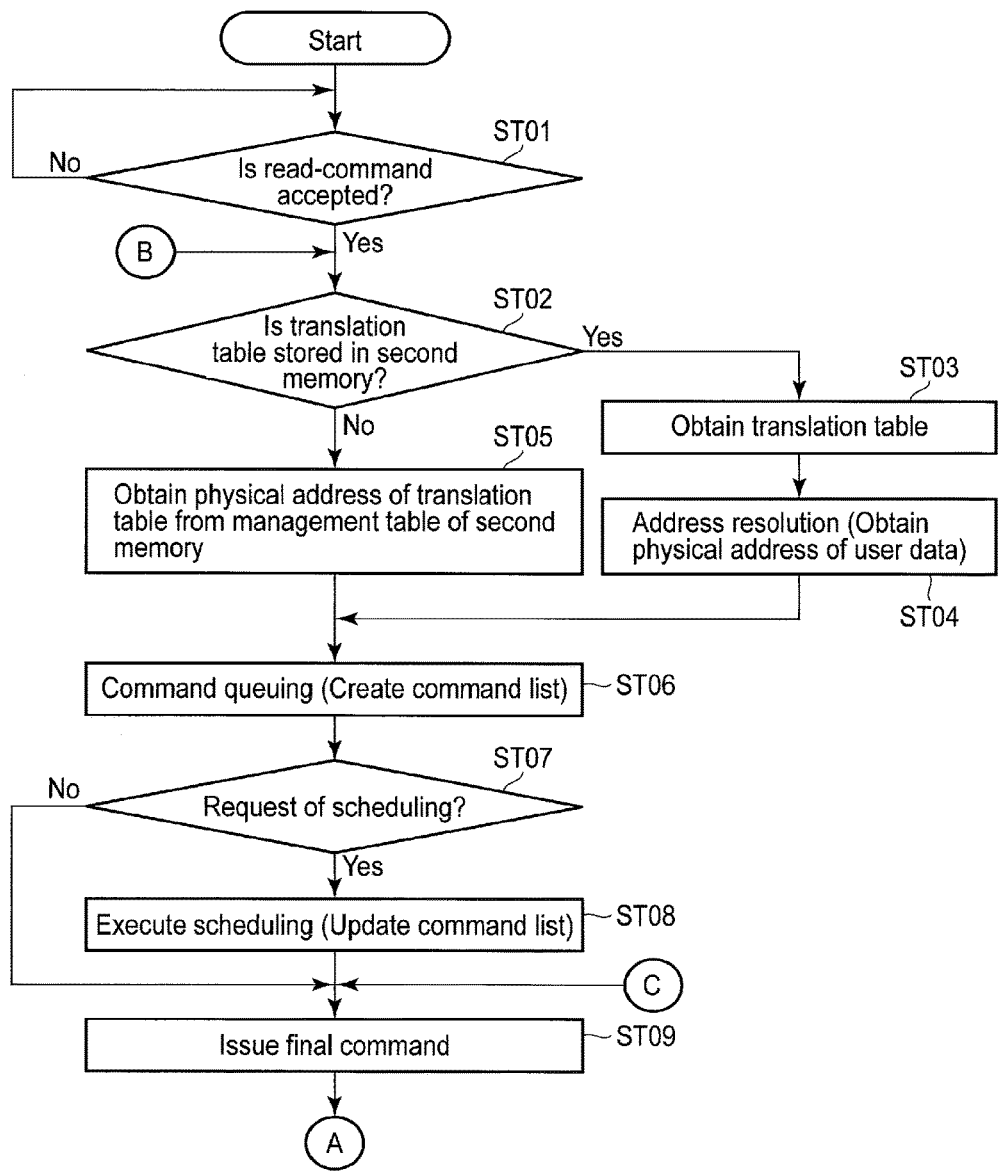
FIGS. 11 and 12 are flowcharts showing an example of the operations of the storage devices of FIGS. 9 and 10.
Figure 12:
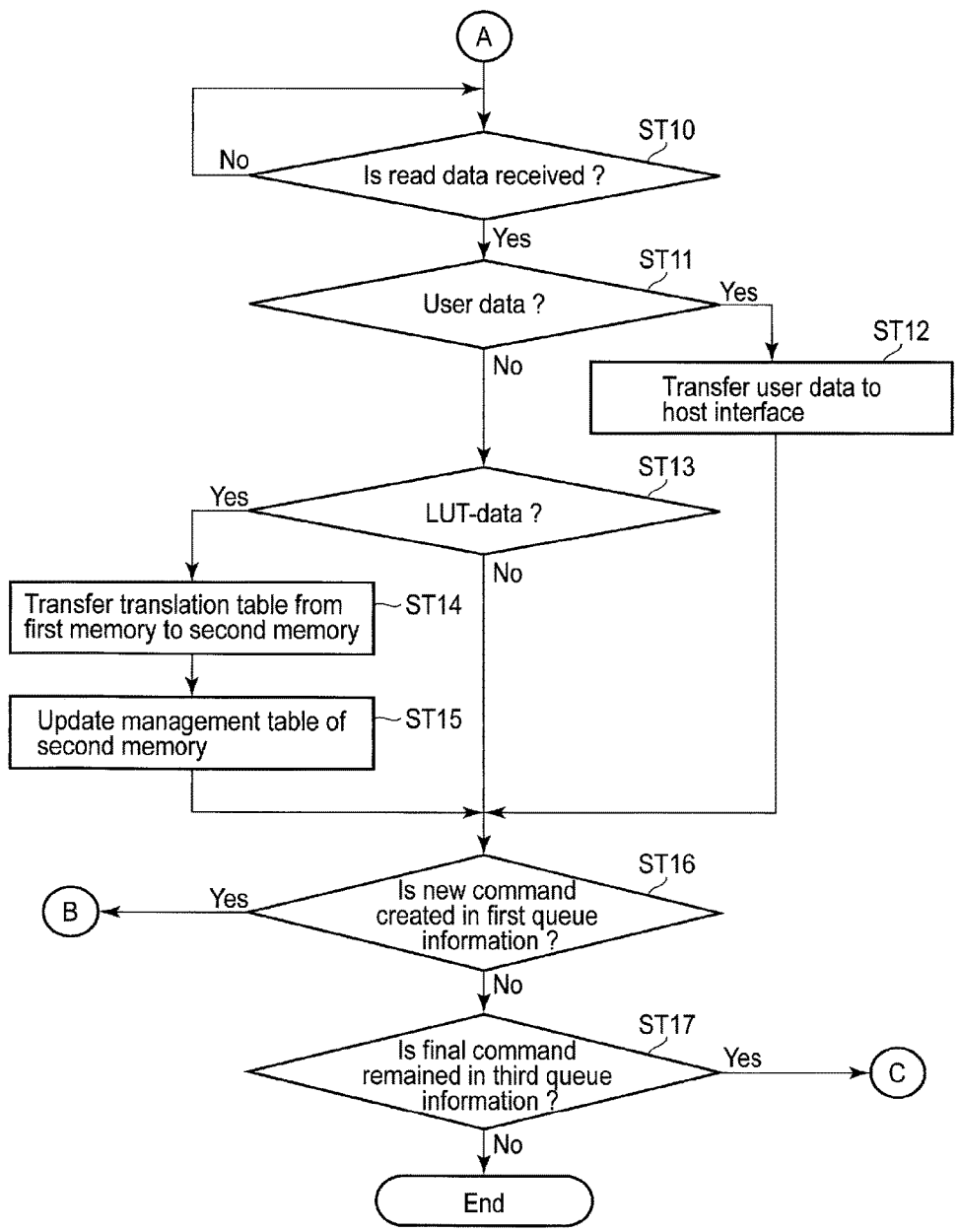

FIGS. 11 and 12 are flowcharts showing the operations of the storage devices of FIGS. 9 and 10.

When a plurality of read commands are transferred from the host 10 and received by the host interface 13, firstly, these read commands are queued as the first queue information in the third memory 15 (step ST01). For example, as shown in FIGS. 13 and 14, a plurality of read commands READ_DATA_A, READ_DATA_B, READ_DATA_C, . . . from the host 10 are queued as the first queue information in the third memory 15.

After the plurality of read commands from the host 10 are received by the host interface 13, the controller 16 determines based on the first queue information whether the translation table of data corresponding to these read commands is stored in the second memory 14 or not (step ST02).

That is, if the controller 16 determines that the translation table of data corresponding to a predetermined read command in the plurality of read commands is stored in the second memory 14, the controller 16 obtains the translation table from the second memory 14 and translates a logical address LA corresponding to the predetermined read command to a physical address (steps ST03 and ST04).

Figure 14:
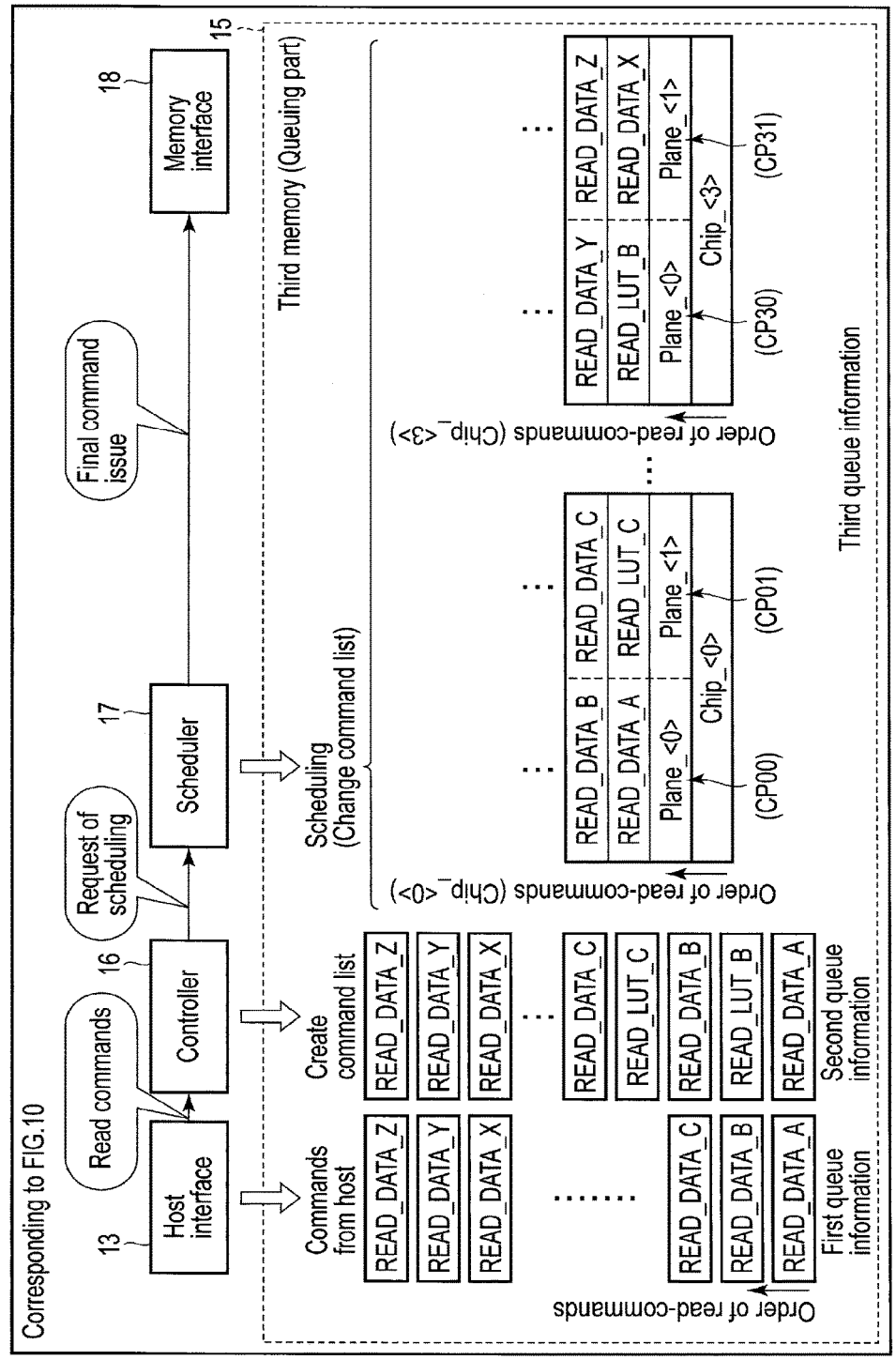

For example, as shown in FIGS. 13 and 14, if the controller 16 determines that the translation table of data corresponding to read command READ_DATA_A is stored in the second memory 14, the controller 16 obtains the translation table from the second memory 14 and translates (address resolution) a logical address LA corresponding to read command READ_DATA_A to a physical address.

Further, if the controller 16 determines that the translation table of data corresponding to a predetermined read command in a plurality of read commands is not stored in the second memory 14, the controller 16 obtains a physical address PA of the translation table of the first memory 12 from the management table of the second memory 14 and issues a table read command to read the translation table (step ST05).

For example, as shown in FIGS. 13 and 14, if the controller 16 determines that the translation table of data corresponding to read commands READ_DATA_B and READ_DATA_C is not stored in the second memory 14, the controller 16 obtains physical addresses of the translation table of the first memory 12 from the management table of the second memory 14 and issues table read commands READ_LUT_B and READ_LUT_C to read the translation table.

The controller 16 generates the second queue information (command list) including read commands READ_DATA_A, READ_DATA_B, READ_DATA. C, . . . from the host as well as table read commands READ_LUT_B and READ_LUT_C. The controller 16 stores the second queue information in the third memory 15.

If the controller 16 determines to carry out scheduling, for example, if the first memory 12 is configured to be capable of selecting a plurality of different word lines in parallel as shown in FIGS. 2 to 6 and the controller 16 determines that scheduling will improve the throughput of the read operation, the controller 16 issues a scheduling request to the scheduler 17 (step ST07).

On receiving the scheduling request from the controller 16, the scheduler 17 schedules the plurality of read commands in the second queue information to execute these commands efficiently (step ST08).

For example, as shown in FIGS. 13 and 14, based on the second queue information, the scheduler 17 generates the third queue information including data read commands READ_DATA_A, READ_DATA_B, READ_DATA_C, . . . and table read commands READ_LUT_B and READ_LUT_C scheduled to be executable in parallel.

Then, the controller 16 or the scheduler 17 issues final commands to the first memory 12 based on the third queue information (step ST09).

For example, in the case of the storage device of FIG. 9, as shown in FIG. 13, the scheduler 17 generates the third queue information and requests the controller 16 to issue final commands, and the controller 16 issues final commands to the first memory 12 in response to the final command request. Further, in the case of the storage device of FIG. 10, as shown in FIG. 14, the scheduler 17 generates the third queue information and then issue final commands to the first memory 12.

When the controller 16 receives read data from the first memory 12, the controller 16 executes the following processing according to the type of read data (step ST10).

For example, if the read data is user data, the read data is subjected to error correction processing and is then transferred to the host 10 via the host interface 13 (steps ST11 and ST12). Further, if the read data is LUT data, the LUT data is subjected to error correction processing and is then stored in the translation table of the second memory 14. The management table of the second memory 14 is then updated (steps ST13 to ST15).

Further, if new read commands are transferred from the host 10 and are queued in the first queue information, the controller 16 executes processing to update the second queue information and the third queue information (step ST16).

Still further, if final commands are still in the third queue information, the controller 16 or the scheduler 17 issues the final commands again to the first memory 12 based on the third queue information (step ST17).

FIGS. 15 to 24 show the scheduling procedure in step ST08 of FIG. 11.

The first example is the scheduling procedure in a case where read commands READ_DATA_A, READ_DATA_B, READ_DATA_C, READ_DATA_D, READ_DATA_E, ..., READ_DATA_X, READ_DATA_Y and READ_DATA_Z are queued as the first queue information.

Figure 15:
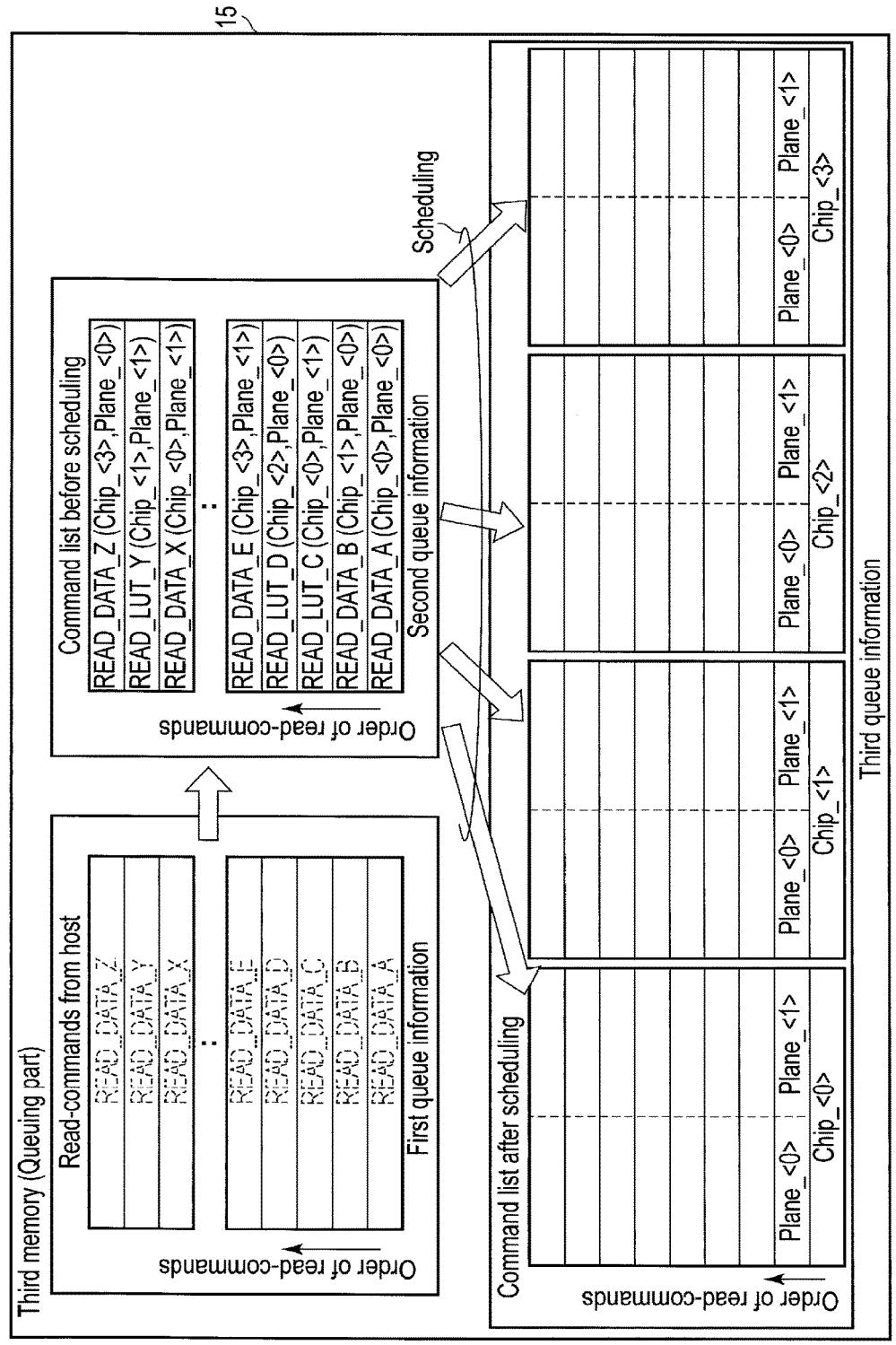

First, as shown in FIGS. 15 and 16, the controller 16 generates the second queue information based on the first queue information. The second queue information includes read commands READ_DATA_A, READ_DATA_B, READ_LUT_C, READ_LUT_D, READ_DATA_E, ..., READ_DATA_X, READ_LUT_Y and READ_DATA_Z. When the read commands in the first queue information are queued in the second queue information, the read commands are deleted from the first queue information.

In FIGS. 15 and 16, a command denoted by a reference symbol (Chip_<x>, Plane_<y>) means an access to memory cell array Plane_<y> in channel (chip) CHx of FIG. 9 or 10. For example, read command READ_DATA_A (Chip_<0>, Plane_<0>) is a command to read data corresponding to read command READ_DATA_A from memory cell array Plane_<0> in channel CH0.

The scheduler 17 generates the third queue information based on the second queue information. For example, as shown in FIG. 16, five read commands READ_DATA_A, READ_DATA_B, READ_LUT_C, READ_LUT_D and READ_DATA_E stored in memory cell arrays Plane_<y> in channels CHx without overlapping with each other are selected and then sorted in the third queue information.

When five read commands READ_DATA_A, READ_DATA_B, READ_LUT_C, READ_LUT_D and READ_DATA_E in the second queue information are queued in the third queue information, these five read commands READ_DATA_A, READ_DATA_B, READ_LUT_C, READ_LUT_D and READ_DATA_E are deleted from the second queue information.

That is, after the five read commands READ_DATA_A, READ_DATA_B, READ_LUT_C, READ_LUT_D and READ_DATA_E are scheduled, the plurality of commands in the second queue information are updated to read commands READ_LUT_F, READ_LUT_G, READ_DATA_H, READ_DATA_I, READ_LUU_J, ..., READ_DATA_X, READ_LUT_Y and READ_DATA_Z.

The scheduler 17 generates the third queue information continuously based on the second queue information. For example, as shown in FIG. 17, five read commands READ_LUT_F, READ_LUT_G, READ_DATA_H, READ_DATA_I and READ_LUU_J stored in memory cell arrays Plane_<y> in channels CHx without overlapping with each other are selected and then sorted in the third queue information.

When five read commands READ_LUT_F, READ_LUT_G, READ_DATA_H, READ_DATA_I and READ_LUU_J in the second queue information are queued in the third queue information, these five read commands READ_LUT_F, READ_LUT_G, READ_DATA_H, READ_DATA_I and READ_LUU_J are deleted from the second queue information.

Similarly, the rest of the read commands ..., READ_DATA_X, READ_LUT_Y and READ_DATA_Z are sorted in the third queue information.

Once all the read commands in the second queue information are queued in the third queue information, there will be no command queued in the second queue.

Figure 18:
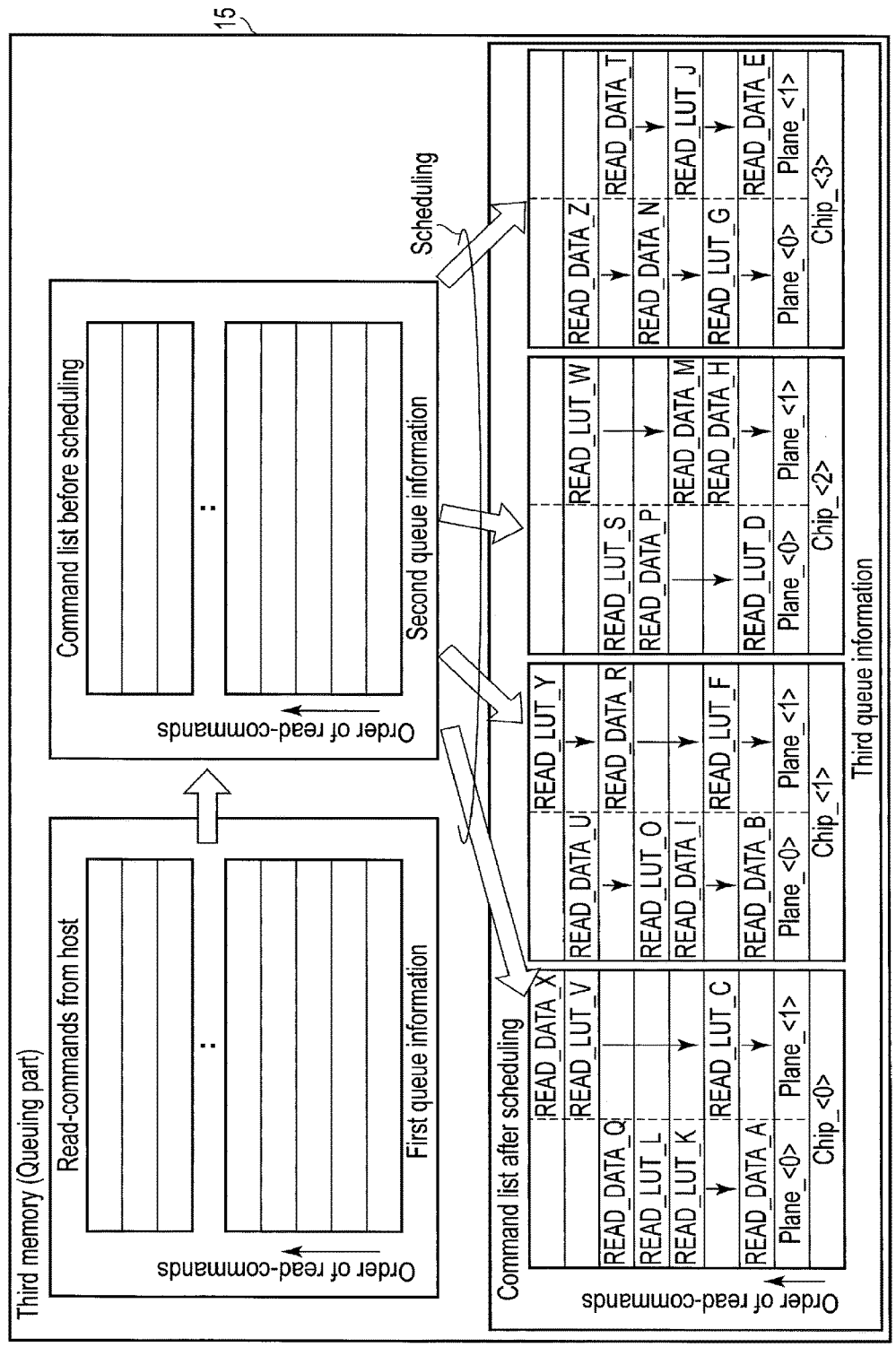

Further, as shown in FIGS. 18 and 19, the scheduler 17 closes up spaces between the read commands sorted in the respective memory cell arrays Plane_<y> of the respective channels CHx and moves the read commands over to the front. According to the above-described scheduling, it is possible to execute a plurality of read commands in parallel, for example, in a plurality of channels CH0, CH1, CH2 and CH3 as well as in a plurality of memory cell arrays Plane_<0> and Plane_<1>.

Figure 20:
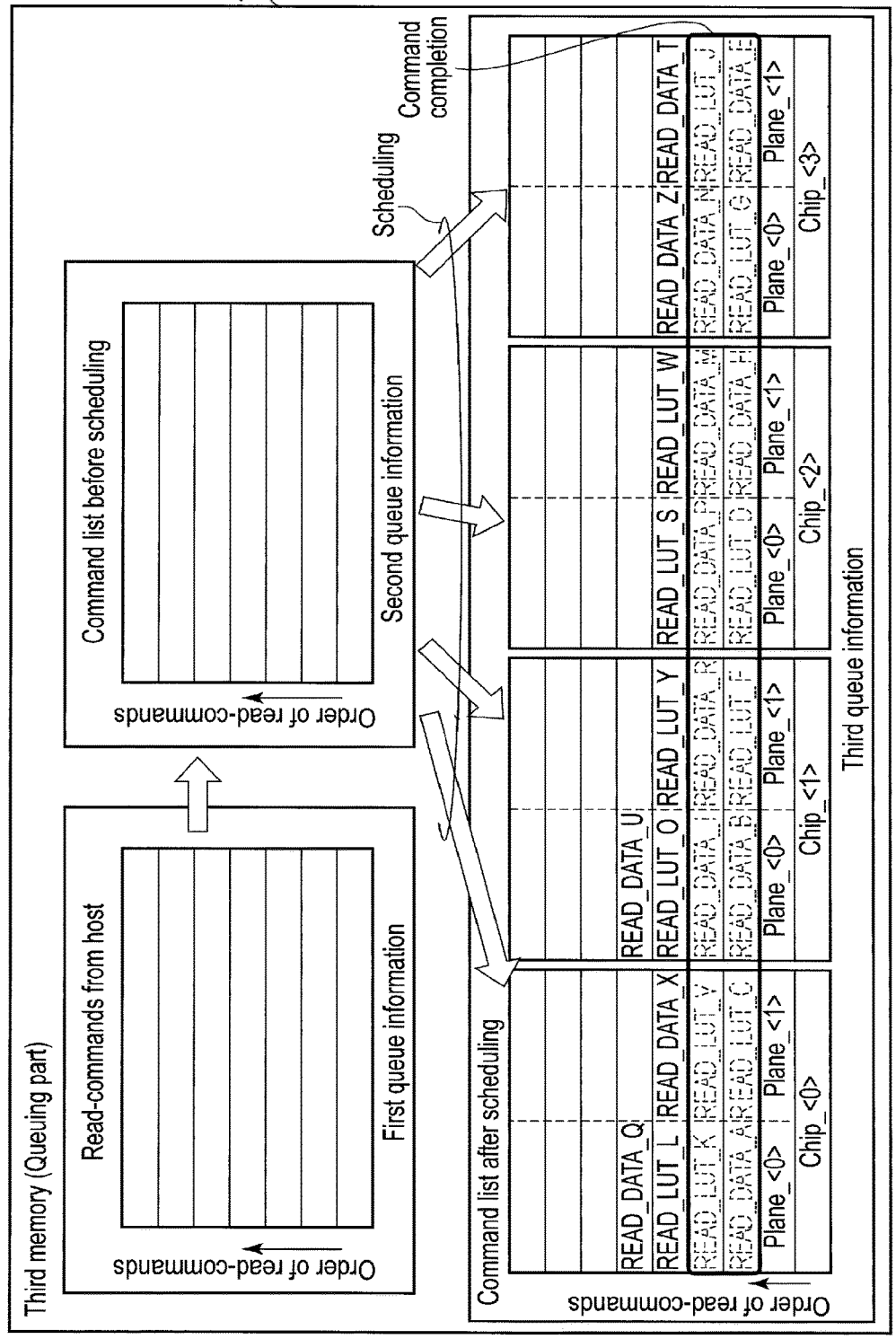

Here, as shown in FIG. 20, for example, each read command in the third queue information as executed, that is, as issued as a final command to the first memory 12, is regarded as a completed command and deleted from the third queue information. Then, the read data corresponding to the final command is read from the first memory 12.

Further, as shown in FIG. 21, if, for example, the first queue information is updated with new read commands transferred from the host 10, the controller 16 updates the second queue information as described above. In the present example, the updated first queue information includes five read commands READ_DATA_F, READ_DATA_G, READ_DATA_K, READ_DATA_V and READ_DATA_J and the updated second queue information includes seven read commands READ_DATA_C, READ_DATA_F, READ_DATA_D, READ_DATA_G, READ_DATA_K, READ_DATA_V and READ_DATA_J.

In the updated second queue information, two read commands READ_DATA_C and READ_DATA_D are commands which have been on hold by the controller 16.

That is, as shown in FIGS. 15 to 20, the translation table of data corresponding to two read commands READ_DATA_C and READ_DATA_D is not in the second memory 14 at first. Therefore, the controller 16 issues table read commands READ_LUT_C and READ_LUT_D to read the translation table of the data.

Then, as shown in FIG. 20, two table read commands READ_LUT_C and READ_LUT_D are executed and the translation table of data corresponding to two read commands READ_DATA_C and READ_DATA_D is read to the second memory 14, and the controller 16 queues read commands READ_DATA_C and READ_DATA_D in the second queue information.

Figure 22:
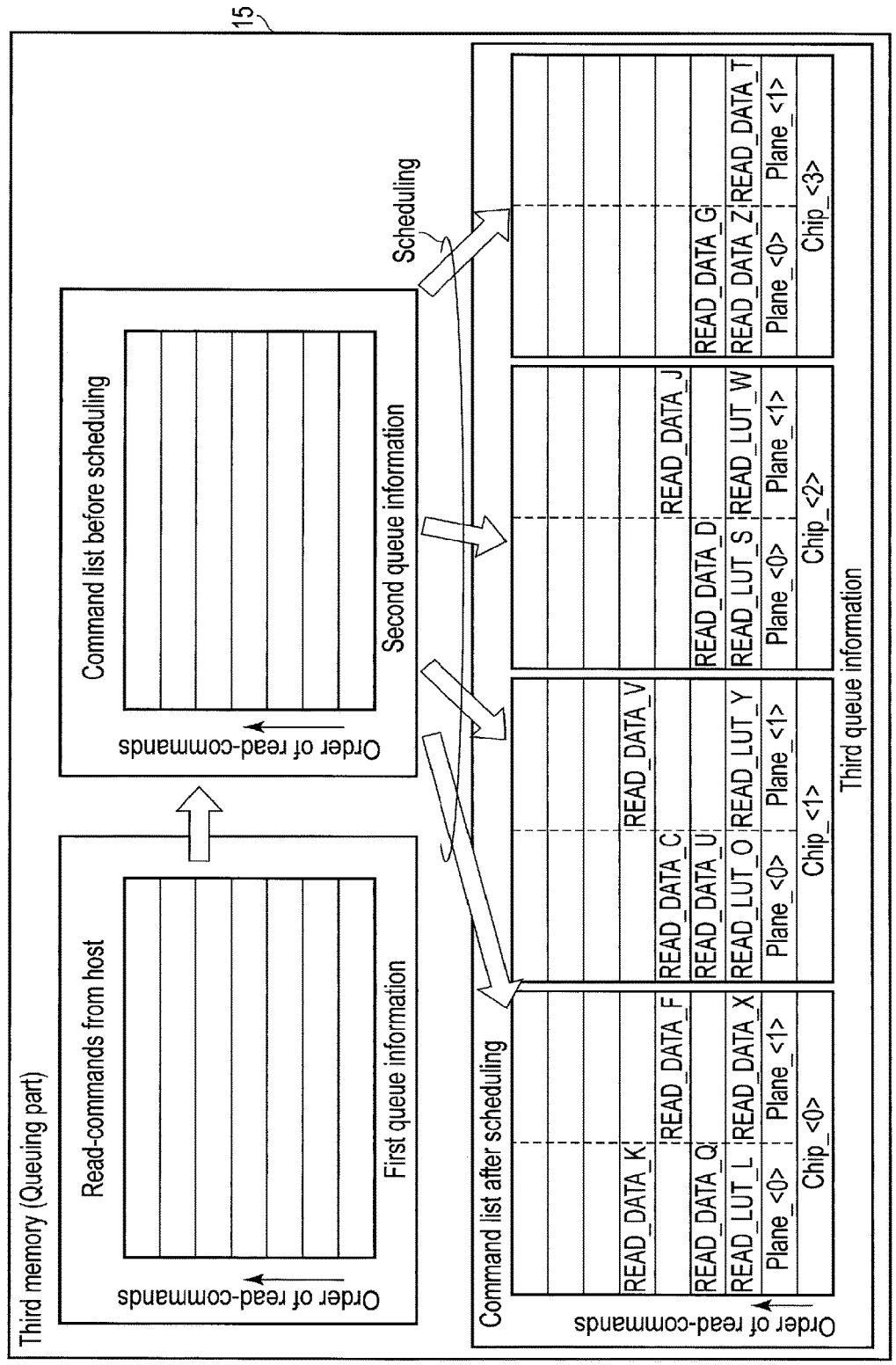

The scheduler 17 updates the third queue information based on the second queue information. For example, as shown in FIG. 22, seven read commands READ_DATA_C, READ_DATA_F, READ_DATA_D, READ_DATA_G, READ_DATA_K, READ_DATA_V and READ_DATA_J stored in memory cell arrays Plane_<y> in channels CHx without overlapping with each other are sorted in the third queue information.

When seven read commands READ_DATA_C, READ_DATA_F, READ_DATA_D, READ_DATA_G, READ_DATA_K, READ_DATA_V and READ_DATA_J of the second queue information are queued in the third queue information, these seven read commands READ_DATA_C, READ_DATA_F, READ_DATA_D, READ_DATA_G, READ_DATA_K, READ_DATA_V and READ_DATA_J are deleted from the second queue information.

Figure 23:
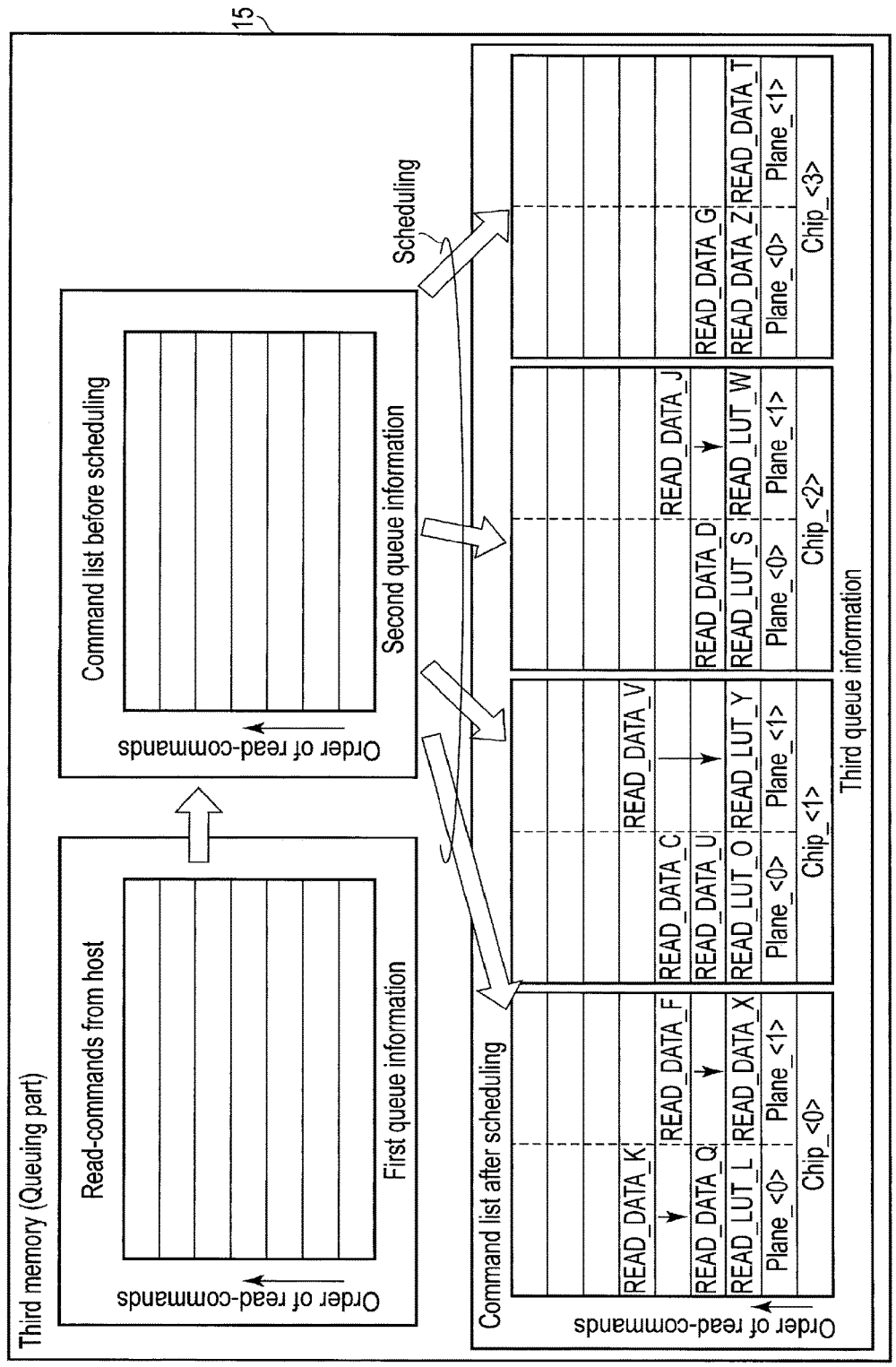

Further, as shown in FIGS. 23 and 24, the scheduler 17 closes up spaces between the read commands sorted into the respective memory cell arrays Plane_<y> of the respective channels CHx and moves the read commands over to the front. Still further, each read command in the third queue information as executed, that is, as issued as a final command to the first memory 12 is regarded as a completed command and deleted from the third queue information. Finally, read data corresponding to the final command is read from the first memory 12.

Some examples of scheduling will be described below.

In these examples, the scheduling is executed under predetermined conditions.

Figure 25:
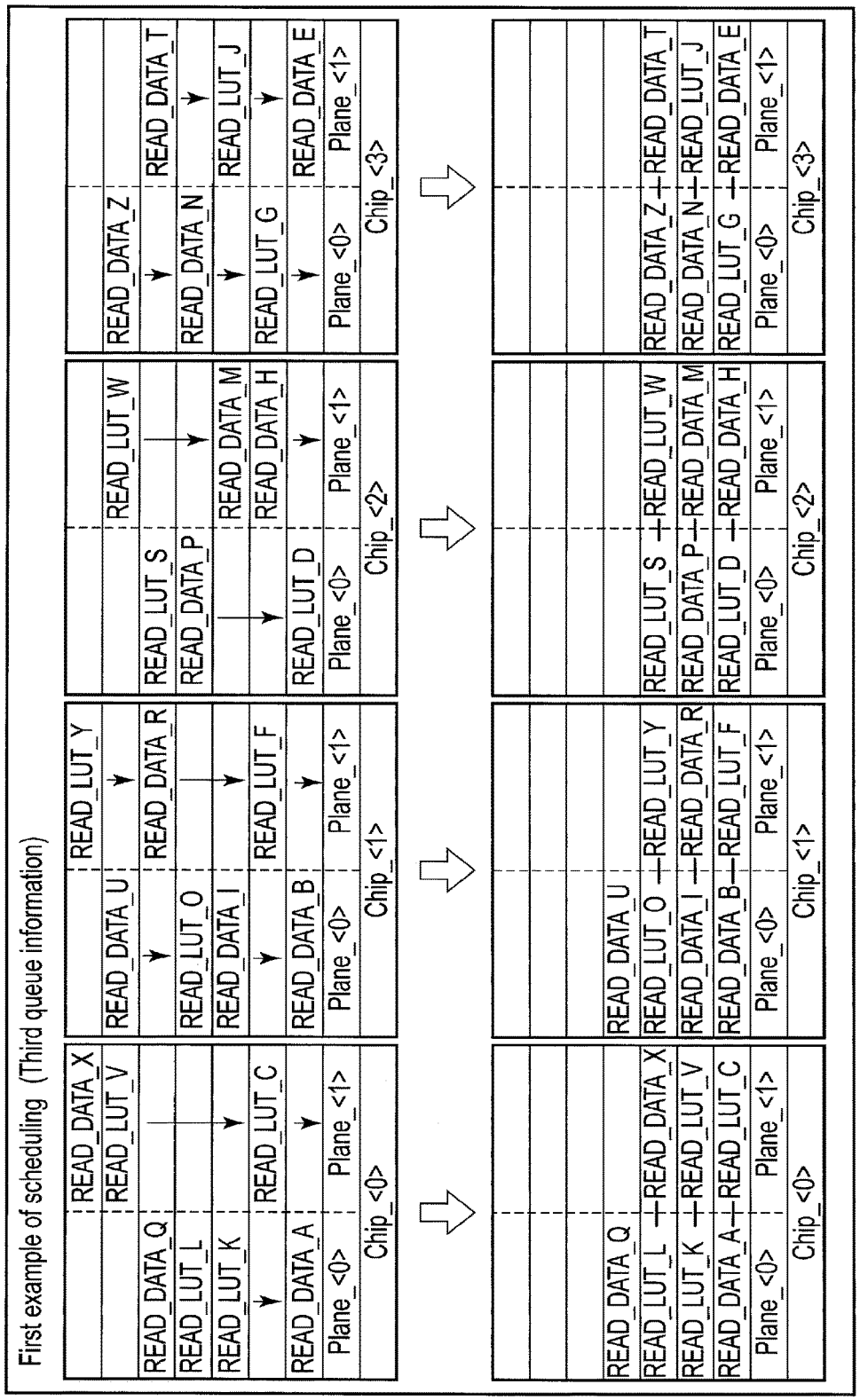
FIG. 25 is a diagram showing a first example of scheduling.

FIG. 25 shows the first example of scheduling.

The first example is the case of generating the third queue information by rearranging the order of the commands queued in the second queue information as little as possible. The first example corresponds to the third queue information generated in the scheduling procedure of FIGS. 15 to 24.

Figure 26:
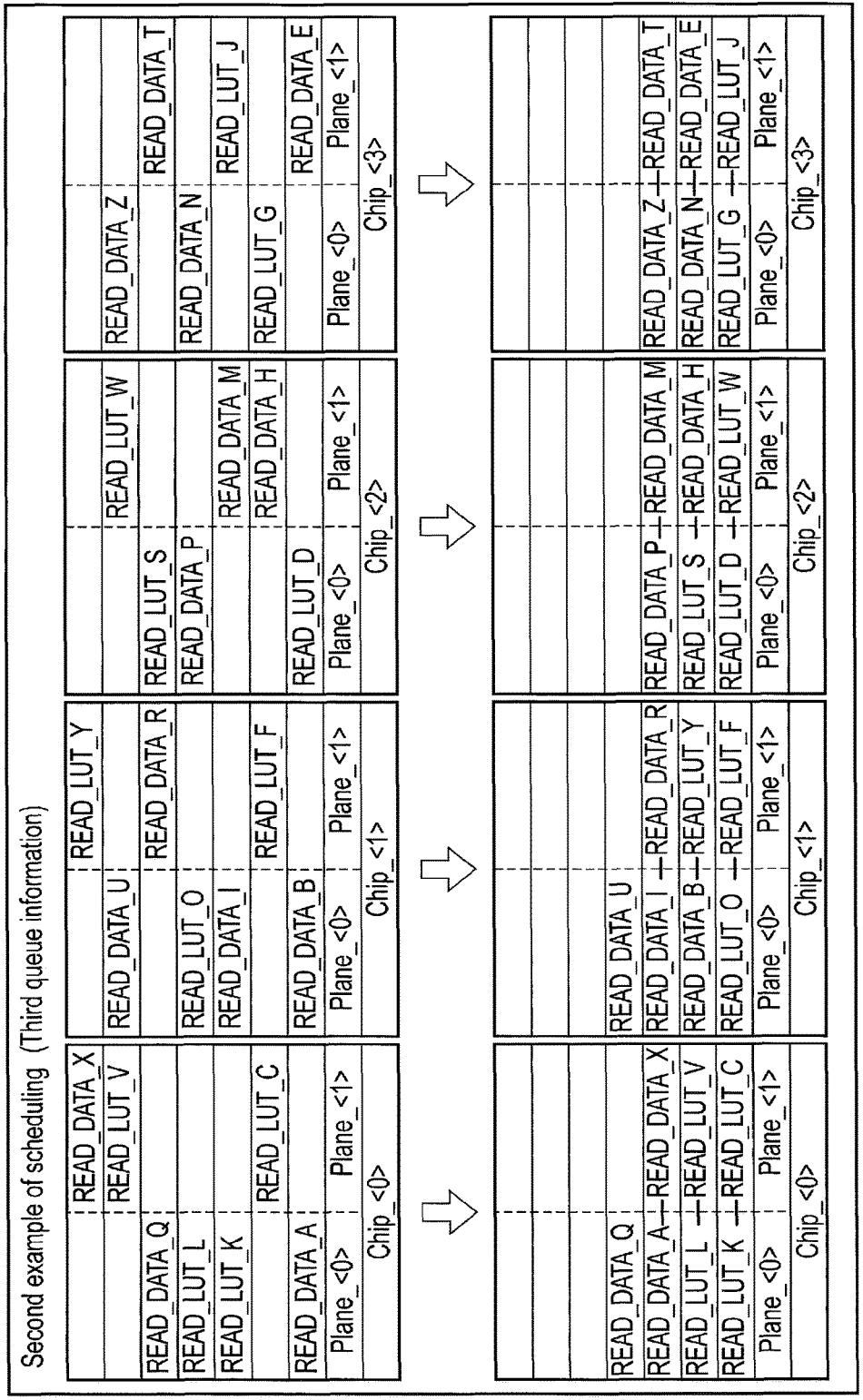
FIG. 26 is a diagram showing a second example of scheduling.

FIG. 26 shows the second example of scheduling.

The second example is the case of generating the third queue information by rearranging the order of the commands queued in the second queue information in such a manner as to execute a table read command to read a translation table preferably. In the second example, since a plurality of table read commands are executed in parallel, it is preferable that the translation table should have been distributed over a plurality of chips Chip_<0>, Chip_<1>, Chip_<2> and Chip_<3> and a plurality of memory cell arrays Plane_<0> and Plane_<1>.

Figure 27:
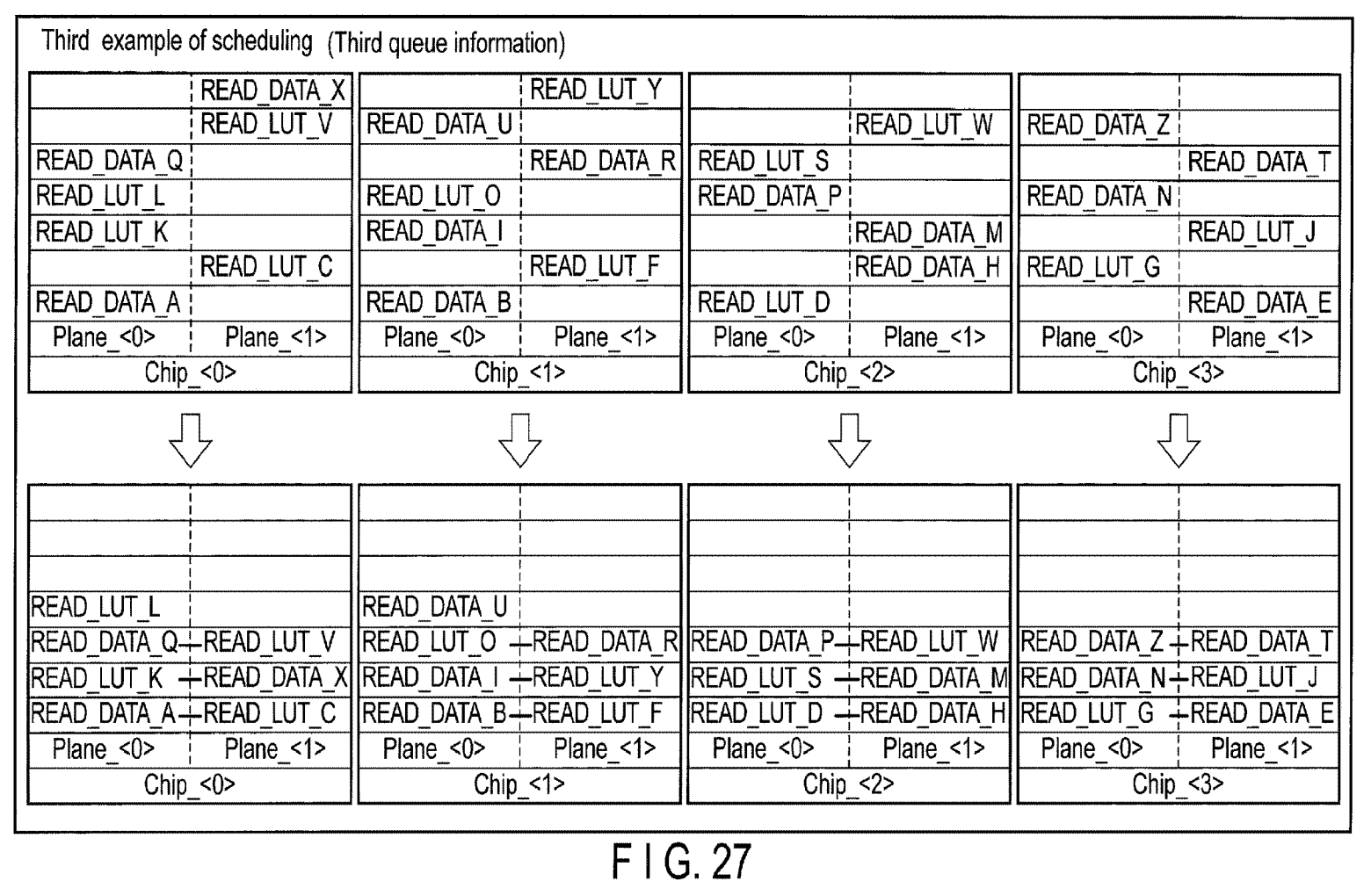

FIG. 27 shows the third example of scheduling.

The third example is the case of generating the third queue information by rearranging the order of the commands queued in the second queue information in such a manner as to execute a data read command to read user data and a table read command to read translation tables in parallel. The third example has a merit of reading the user data at an earlier stage as compared to that of the second example (FIG. 26) since the translation table of the user data has already been read into the second memory.

FIG. 28 shows the fourth example of scheduling.

The fourth example is a modification of the third example.

In the third example, it is impossible to read the user data and the translation table stored in the same memory cell array Plane_<y> in the same memory Chip_<x> in parallel. Therefore, in the fourth example, one translation table (original) is stored in memory cell array Plane_<0> and another translation table (copy) is stored in memory cell array Plane_<1>.

Figure 29:
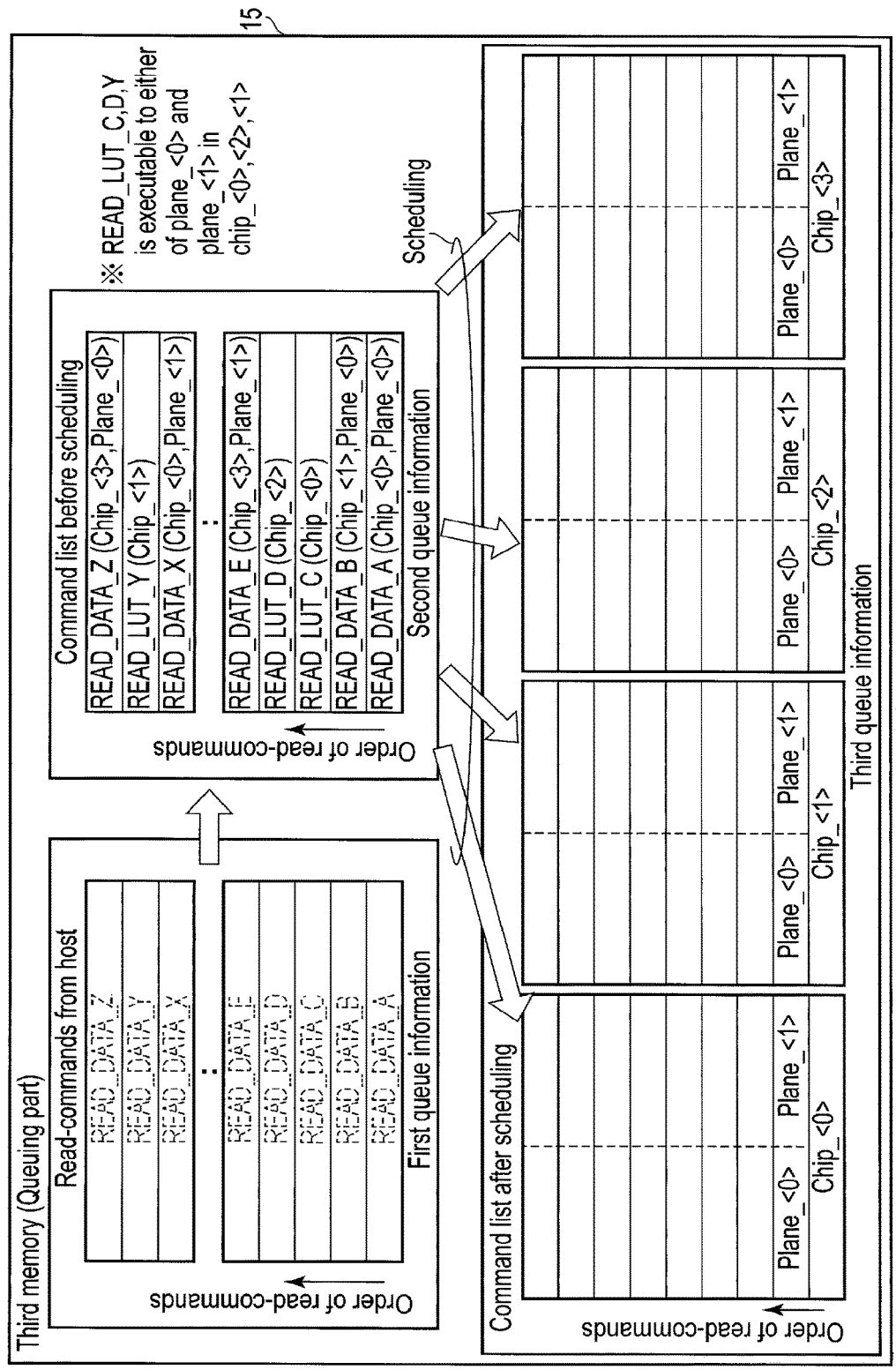
FIG. 29 is a diagram showing the procedure of scheduling using the first memory of FIG. 28.

Both of the one translation table (original) and the other translation table (copy) are the same data, and thus the first memory 12 requires memory capacity twice as large as normal to store the translation table. However, for example, as shown in FIGS. 29 and 30, it becomes possible to read the translation table from the first memory 12 into the second memory 14 without consideration of memory cell array data Plane_<0> and Plane_<1>.

Therefore, there will be no such situation where the user data and the translation table are in the same memory cell array Plane_<y> in the same memory Chip_<x> and thus cannot be read in parallel. It is because, for example, even if the user data and the translation table (original) are stored in the same memory cell array Plane_<0> in the same memory Chip_<0>, the translation table (original) is also stored in memory cell array Plane_<1> as a copy of the translation table (copy).

Note that, in the fourth example, it is also possible to store the one translation table (original) in memory cell array Plane_<1> and the other translation table (copy) in memory cell array Plane_<0> instead.

FIG. 31 shows the fifth example of scheduling.

As in the case of the fourth example, the fifth example is a modification of the third example.

In the fourth example, the translation table (original or copy) is stored in two memory cell arrays Plane_<0> and Plane_<1>. In the fifth example, on the other hand, one user data (original) is stored in memory cell array Plane_<0> and another user data (copy) is stored in memory cell array Plane_<1>.

Figure 33:
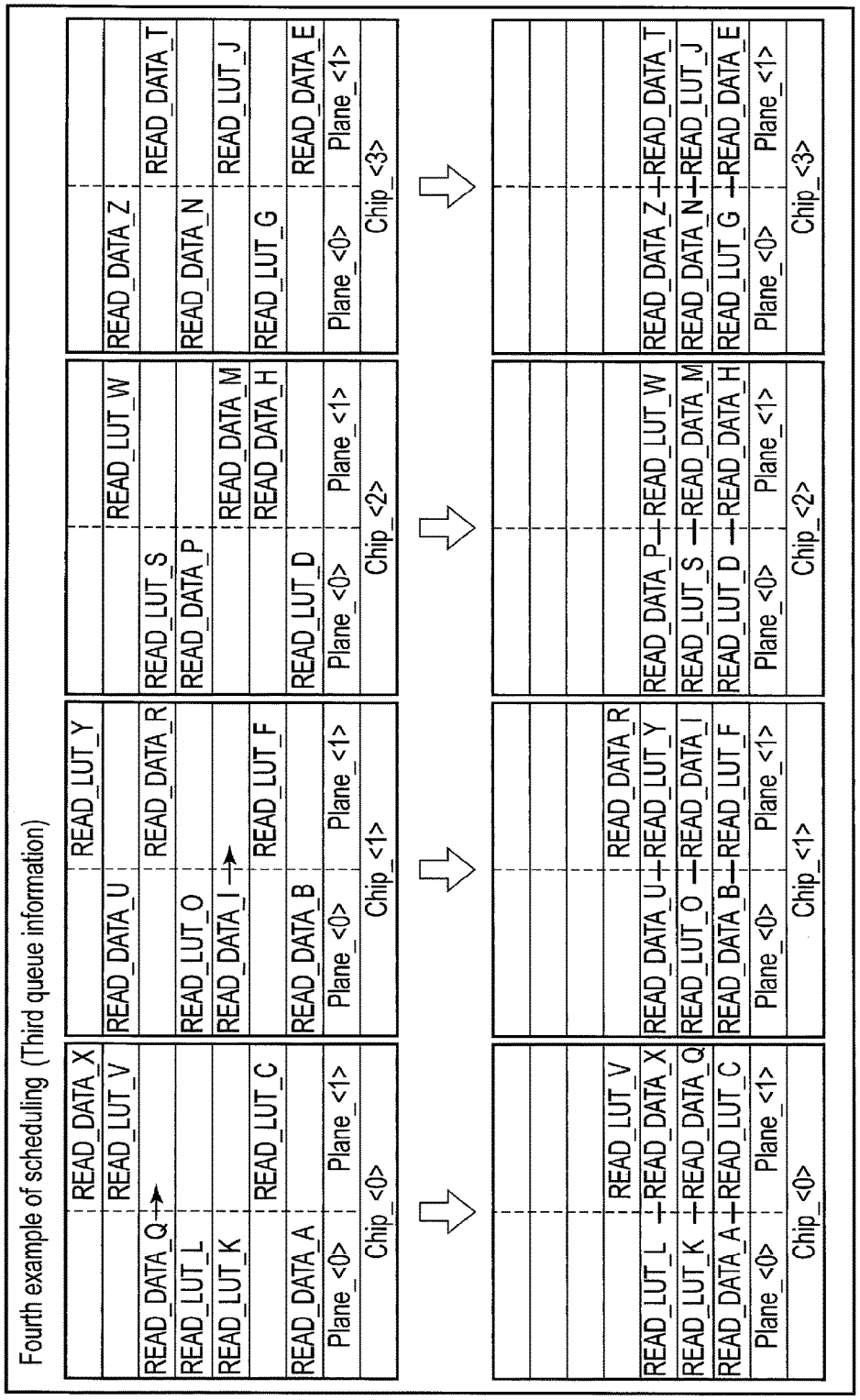
FIG. 33 is a diagram showing a fifth example of scheduling.

The one user data (original) and the other user data (copy) are the same data, and thus the first memory 12 requires memory capacity twice as large as normal to store the user data. However, for example, as shown in FIGS. 32 and 33, it becomes possible to read the user data from the first memory 12 without considering memory cell array data Plane_<0> and Plane_<1>.

Therefore, there will be no such situation where the user data and the translation table are in the same memory cell array Plane_<y> in the same memory Chip_<x> and thus cannot be read in parallel. It is because, for example, even if the user data (original) and the translation table are stored in the same memory cell array Plane_<0> in the same memory Chip_<0>, the user data (original) is also stored in the other memory cell array Plane_<1> as a copy of the user data (copy).

Note that, in the fifth example, it is also possible to store the one user data (original) in memory cell array Plane_<1> and the other user data (copy) in memory cell array Plane_<0> instead.

The first to fifth examples may be combined with each other.

CONCLUSION

As described above, according to the present embodiment, it is possible to prevent a decrease in the throughput of the read operation of the read data requested from the host even without increasing the memory capacity of a memory (RAM) storing the translation table in the memory controller, that is, without entirely coping the translation table from a memory serving as storage (NAND) for the memory (RAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first memory as a nonvolatile memory including first and second memory cell arrays which are accessible in parallel, the first memory cell array storing first data and second data, the second data including a translation table required for accessing the first data, and the second memory cell array storing third data and fourth data, the fourth data including a translation table required for accessing the third data;
   a second memory in which the second and fourth data can be stored; and
   a scheduler configured to execute scheduling for one command from each of following (A) and (B) of:
   (A) a first command for reading the first data or a second command for reading the second data, and
   (B) a third command for reading the third data or a fourth command for reading the fourth data,
   to be executed by the first memory in parallel;
   wherein
   the scheduler determines whether the second and fourth data are stored in the second memory, and executes the scheduling for the second and fourth commands to be executed in parallel, when the second and fourth data are not stored in the second memory, and the scheduler executes the scheduling for the first and third commands to be executed, after the second and fourth commands are executed in parallel.

2. The memory system of claim 1,
wherein the scheduler executes the scheduling for the first and third commands to be executed in parallel.

3. The memory system of claim 1,
wherein the scheduler executes the scheduling for the first and fourth commands to be executed in parallel, when the second data is stored in the second memory and the fourth data is not stored in the second memory.

4. The memory system of claim 3,
wherein the scheduler executes the scheduling for the third command to be executed after the first and fourth commands are executed in parallel.

5. The memory system of claim 1,
wherein the scheduler executes the scheduling for the first and third commands to be executed in parallel, when the second and fourth data are stored in the second memory.

6. The memory system of claim 5,
wherein the scheduler executes the scheduling for the first and third commands to be executed with higher priority than a fifth command, when a translation table required for accessing fifth data is not stored in the second memory, the fifth command being a command for reading the fifth data from the first memory.

7. The memory system of claim 1,
wherein the second and fourth data are stored in both of the first and second memory cell arrays.

8. The memory system of claim 1,
wherein the first memory cell array includes first memory cells connected to a first word line, the second memory cell array includes second memory cells connected to a second word line, and the first memory is configured to select the first and second word lines in parallel.

9. The memory system of claim 1,
wherein the scheduler executes the scheduling for the second and fourth commands to be executed, in a case that the first and third commands are to be executed based on a request issued by a host and the second and fourth data are not stored in the second memory.

10. The memory system of claim 1, further comprising a controller,
wherein the controller translates a logical address designated by a host into a physical address required for accessing the first memory based on the second and fourth data, when the first and third commands are to be executed based on a request issued by the host and the second and fourth data are stored in the second memory.

11. The memory system of claim 1, wherein the second memory is a volatile memory in which the second and fourth data are storable, and which stores a management table for managing information that indicates whether or not each of the second and fourth data is stored in the second memory.

12. The memory system of claim 1, wherein the second memory is a nonvolatile memory in which the second and fourth data are storable, and which stores a management table for managing information that indicates whether or not each of the second and fourth data is stored in the second memory.

13. The memory system of claim 1, further comprising a third memory storing commands to be issued to the first memory,
wherein the third memory is a buffer memory.

14. The memory system of claim 1,
wherein the first memory includes a first chip and a second chip, the second chip being different from the first chip, and
the first chip includes the first memory cell array, and the second chip includes the second memory cell array.

15. A memory system comprising:
a controller circuit; and
a nonvolatile memory chip configured to be controlled by the controller circuit, the nonvolatile memory chip including:
a plurality of memory cell arrays including a first memory cell array and a second memory cell array;
a first word line decoder attached to the first memory cell array and configured to access, based on an address received from the controller circuit, a word line of the first memory cell array; and
a second word line decoder attached to the second memory cell array and configured to access, based on an address received from the controller circuit, a word line of the second memory cell array; wherein
the controller circuit is configured to:
issue a first command that includes a first address and a second address to the nonvolatile memory chip; and
the nonvolatile memory chip is configured to:
in response to the first command,
read, in parallel, data from a first word line of the first memory cell array based on the first address, and data from a second word line of the second memory cell array based on the second address.

16. The memory system of claim 15, wherein
each of the plurality of memory cell arrays includes a plurality of blocks, each of the plurality of blocks is a unit for erasing data and includes a plurality of word lines including the first word line and the second word line, and
a relative location of the first word line within a block of the first memory cell array is different from a relative location of the second word line within a block of the second memory cell array.

17. The memory system of claim 15, wherein
the controller circuit is configured to instruct the nonvolatile memory chip to read, in parallel:
first user data from the first memory cell array, and
second user data from the second memory cell array.

18. The memory system of claim 15, wherein
the controller circuit is configured to instruct the nonvolatile memory chip to read, in parallel:
first user data from the first memory cell array, and
first address conversion data from the second memory cell array.

19. The memory system of claim 15, wherein
the controller circuit is configured to instruct the nonvolatile memory chip to read, in parallel:
first address conversion data from the first memory cell array, and
second address conversion data from the second memory cell array.

20. The memory system of claim 15, further comprising a volatile memory, wherein
the controller circuit is further configured to:
when none of first address conversion data and second address conversion data is stored in the volatile memory, the first address conversion data being required to read first user data from the nonvolatile memory chip and the second address conversion data being required to read second user data from the nonvolatile memory chip:

read the first address conversion data from the first memory cell array;

read the second address conversion data from the second memory cell array;

store the first address conversion data and the second address conversion data into the volatile memory; and based on the first address conversation data and the second address conversion data stored in the volatile memory, issue a second command as the first command to the nonvolatile memory chip to read, in parallel:

the first user data from the first memory cell array, and the second user data from the second memory cell array.

21. The memory system of claim 20, wherein the controller circuit is configured to issue a third command as the first command to the nonvolatile memory chip to read, in parallel, the first address conversion data from the first memory cell array and the second address conversion data from the second memory cell array.

* * * * *